June 6, 1967　　　J. B. CATALDO ET AL　　　3,324,431
ELECTROMAGNETIC CONTACTOR HAVING INTERCHANGEABLE
AUXILIARY DEVICES
Filed April 24, 1962　　　　　　　　　　　　17 Sheets-Sheet 3
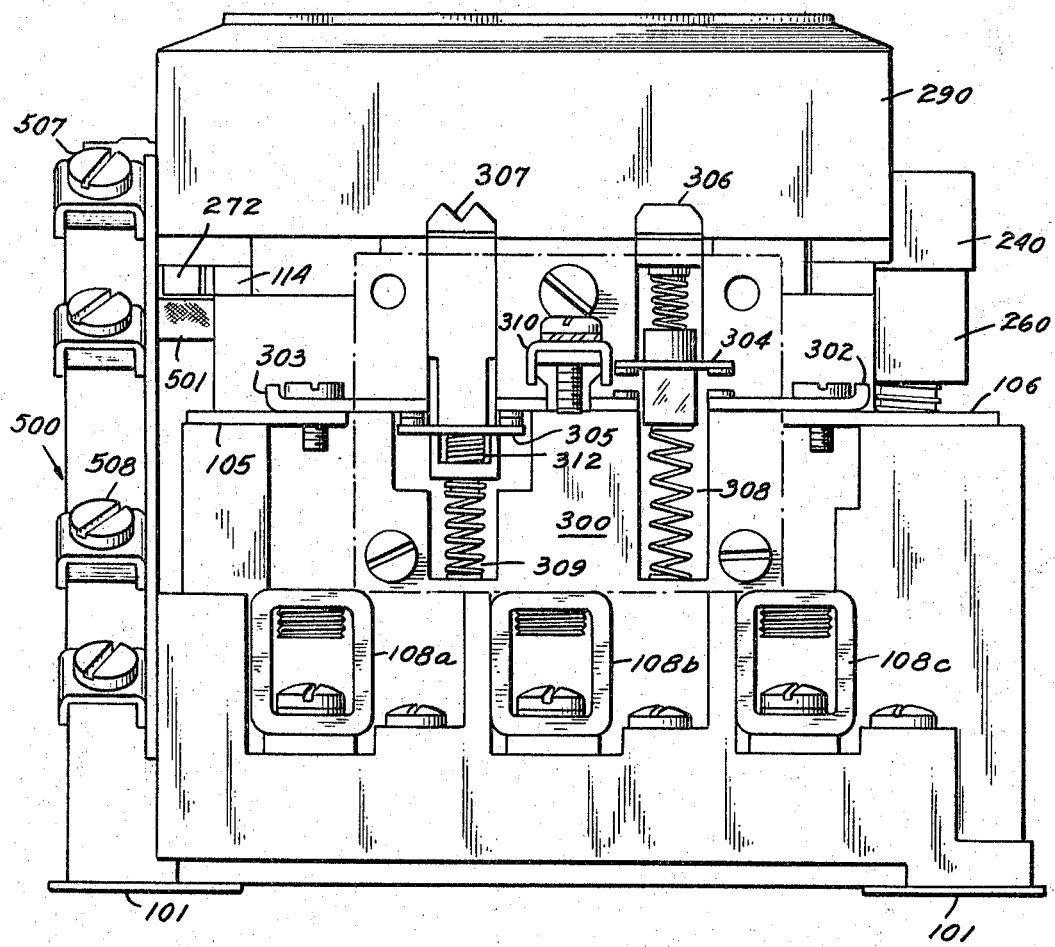
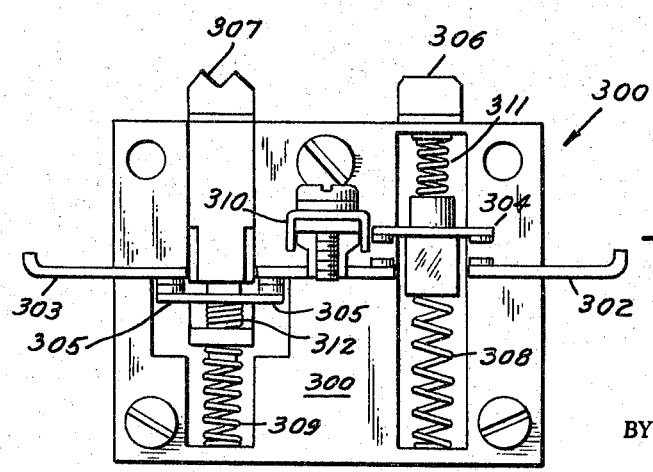
INVENTORS
JOHN B. CATALDO
ELWOOD T. PLATZ
BERNARD DiMARCO
FRANK W. KUSSY
BY
OSTROLENK, FABER, GERB & SOFFEN
ATTORNEYS

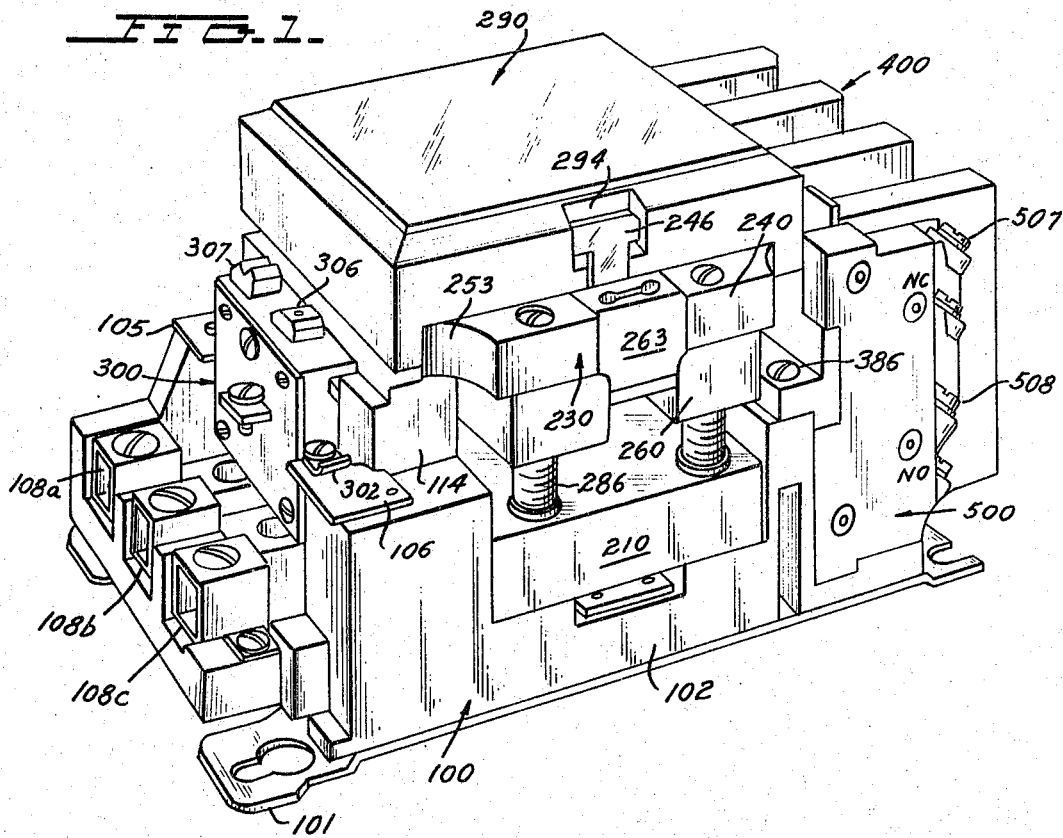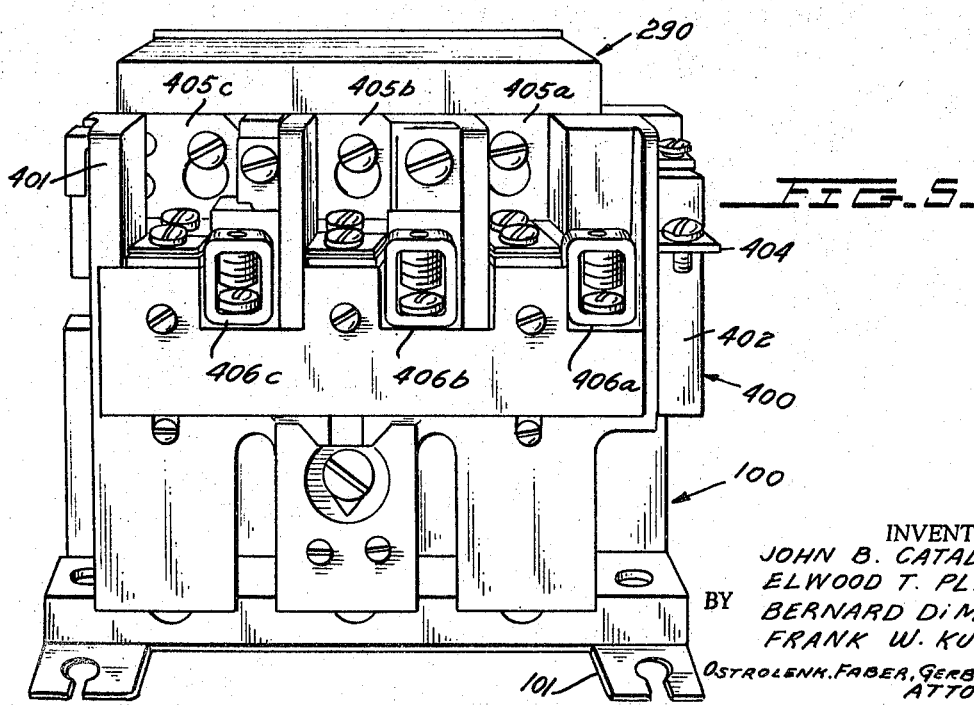

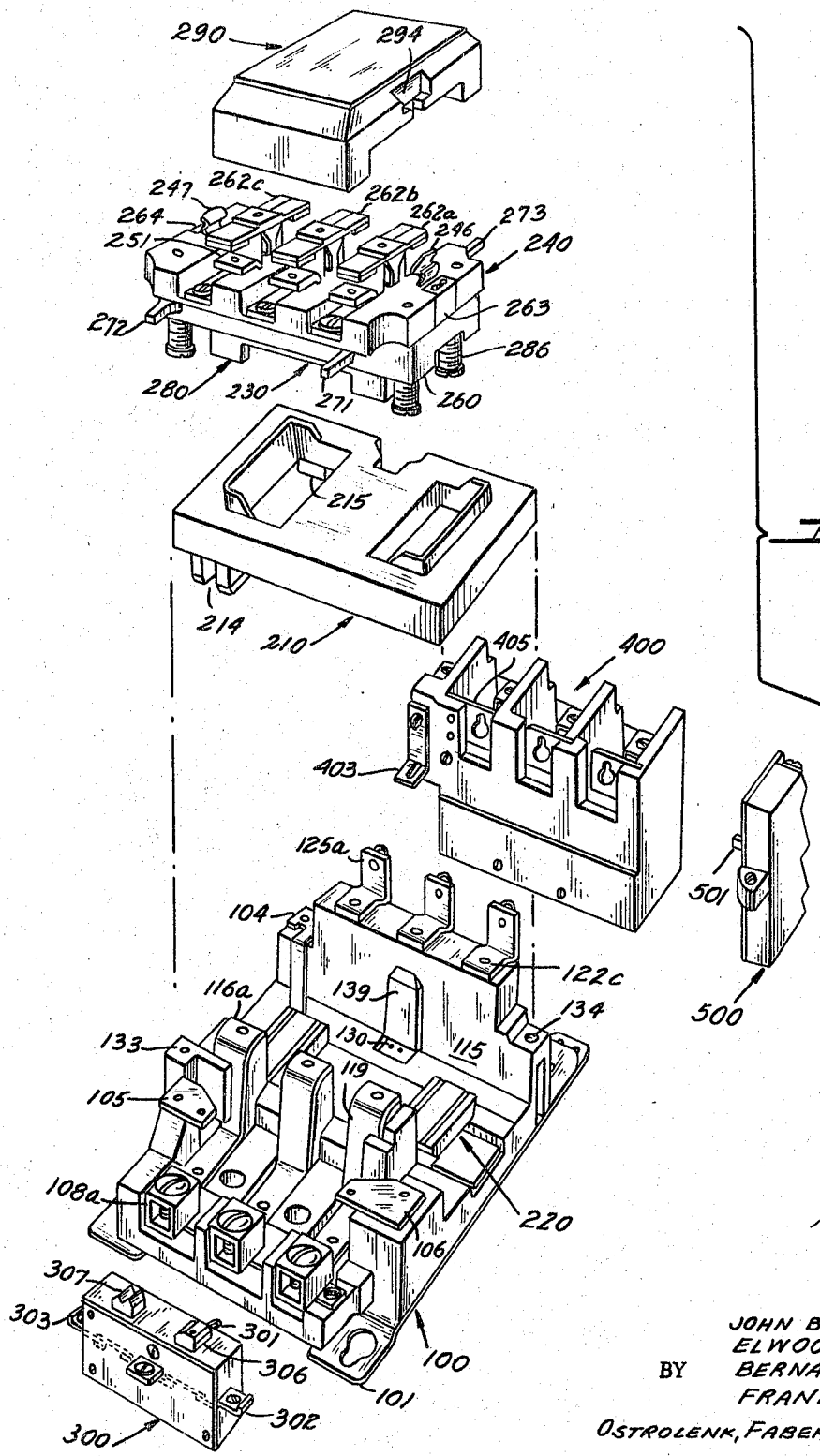

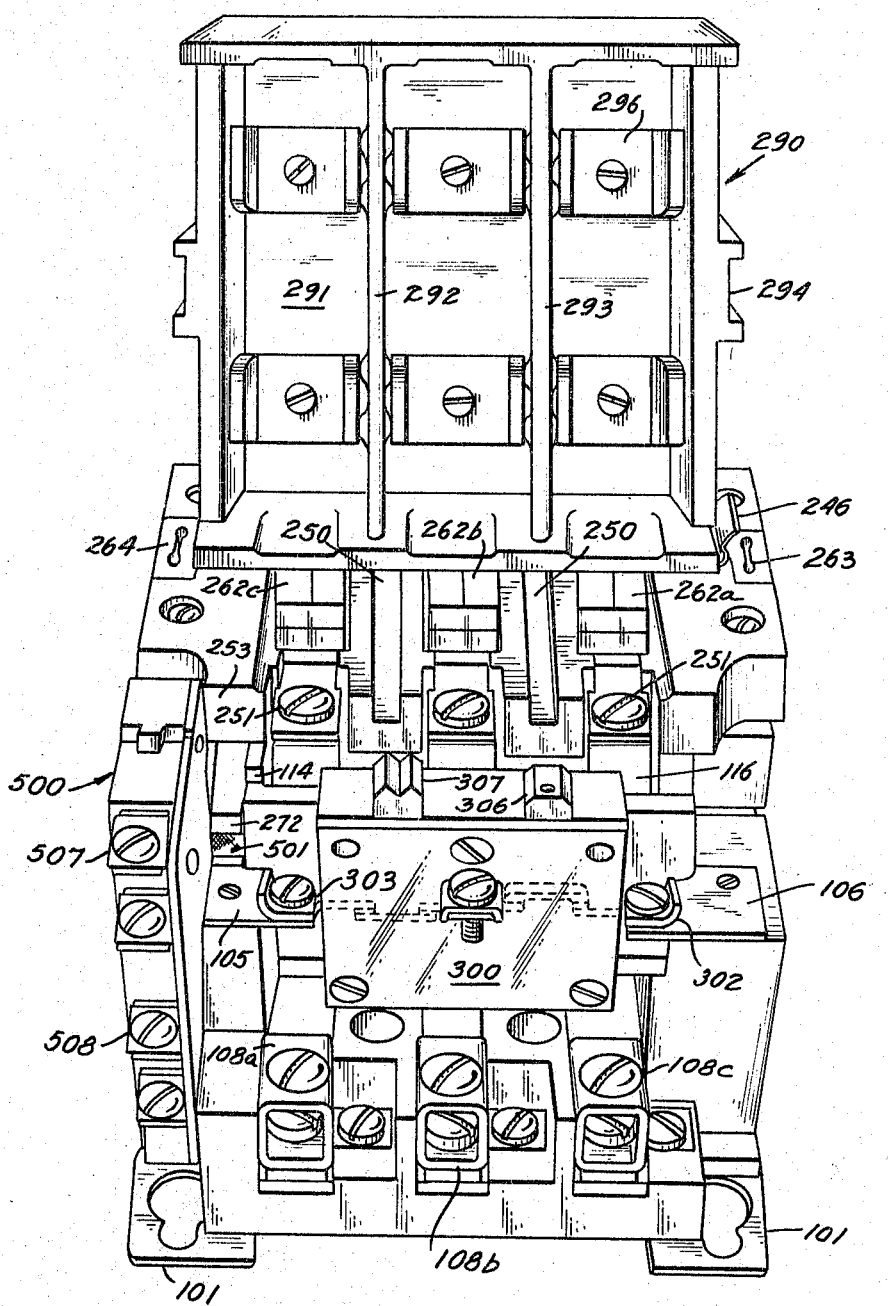

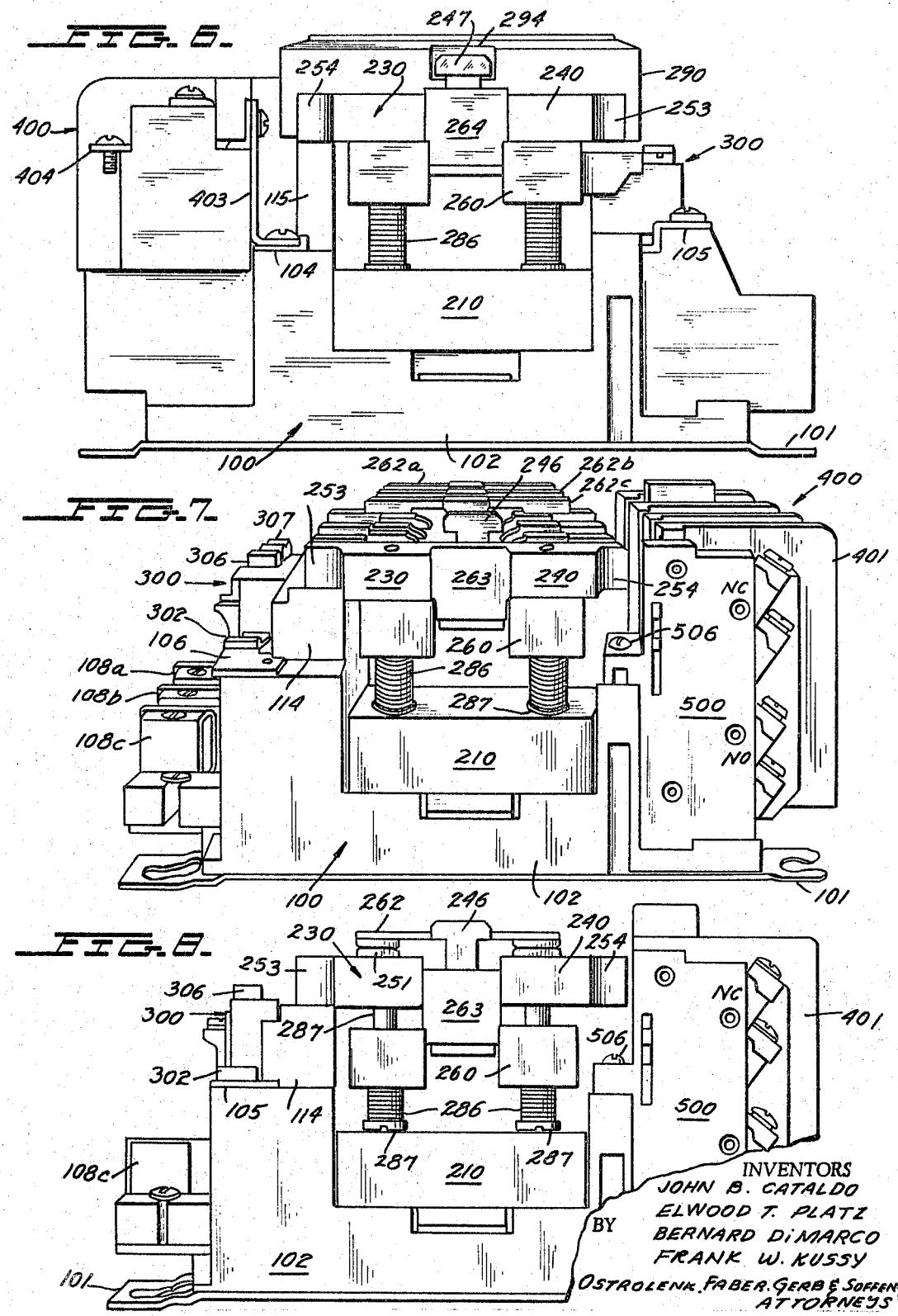

June 6, 1967    J. B. CATALDO ET AL    3,324,431
ELECTROMAGNETIC CONTACTOR HAVING INTERCHANGEABLE
AUXILIARY DEVICES Filed April 24, 1962

INVENTORS
JOHN B. CATALDO
ELWOOD T. PLATZ
BERNARD D. MARCO
FRANK W. KUSSY

BY OSTROLENK, FABER, GERB & SOFFEN
ATTORNEYS

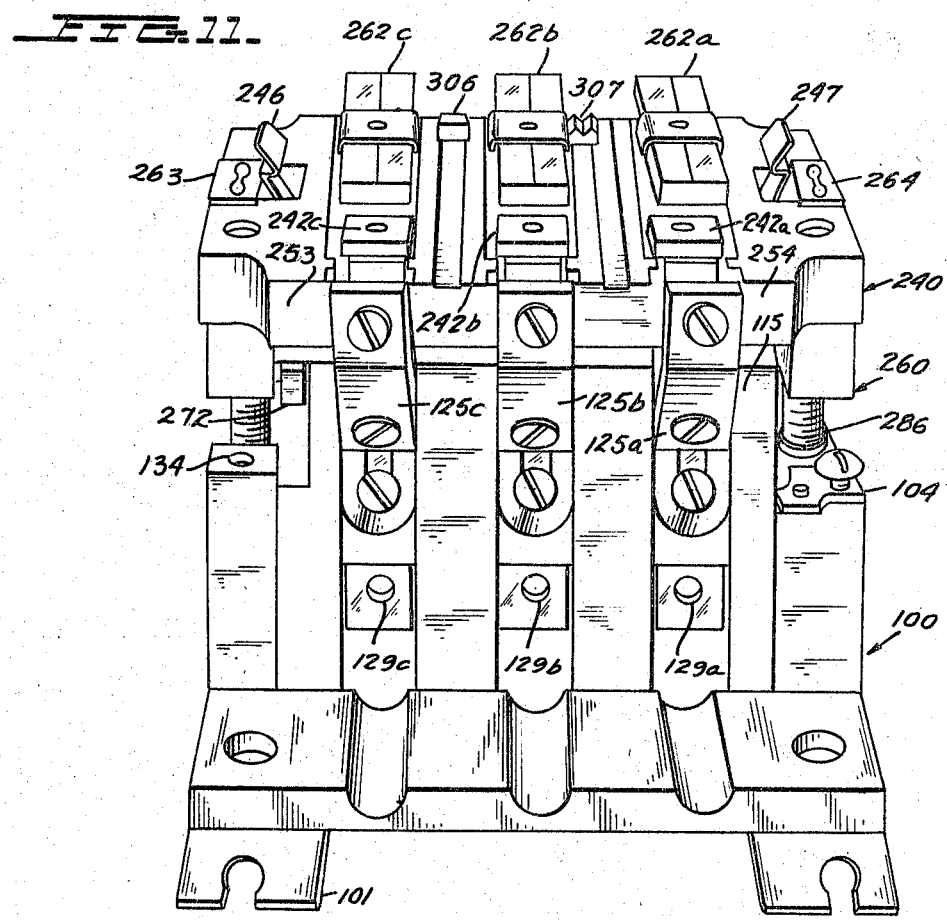
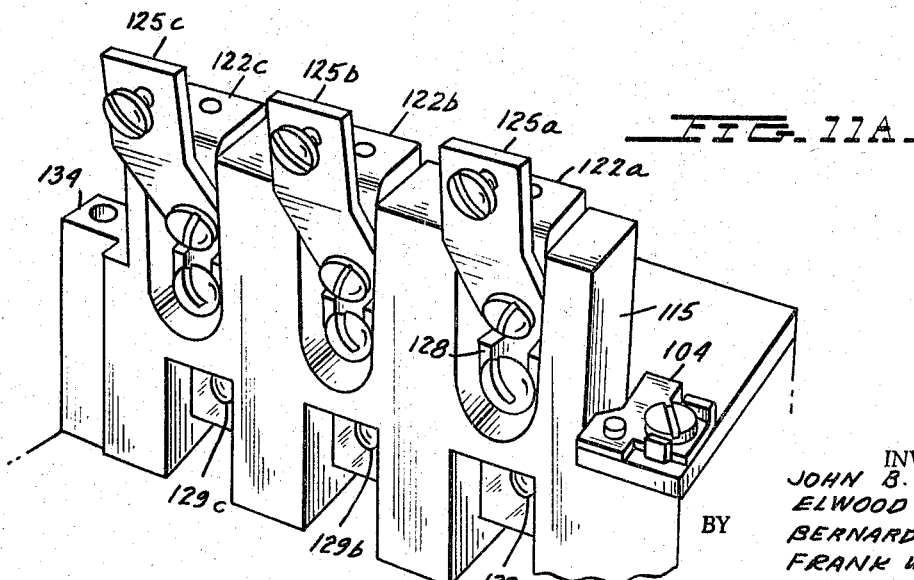

June 6, 1967  J. B. CATALDO ET AL  3,324,431
ELECTROMAGNETIC CONTACTOR HAVING INTERCHANGEABLE
AUXILIARY DEVICES
Filed April 24, 1962  17 Sheets-Sheet 8

INVENTORS
JOHN B. CATALDO
ELWOOD T. PLATZ
BY BERNARD Di MARCO
FRANK W. KUSSY

OSTROLENK, FABER, GERB & SOFFEN
ATTORNEYS

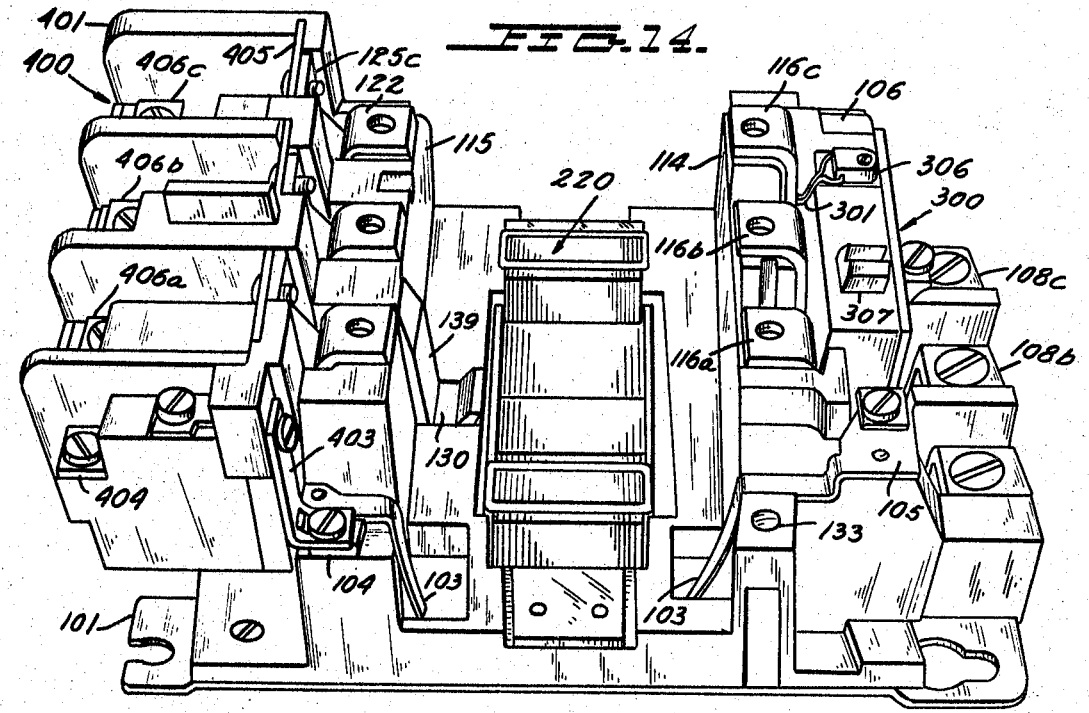
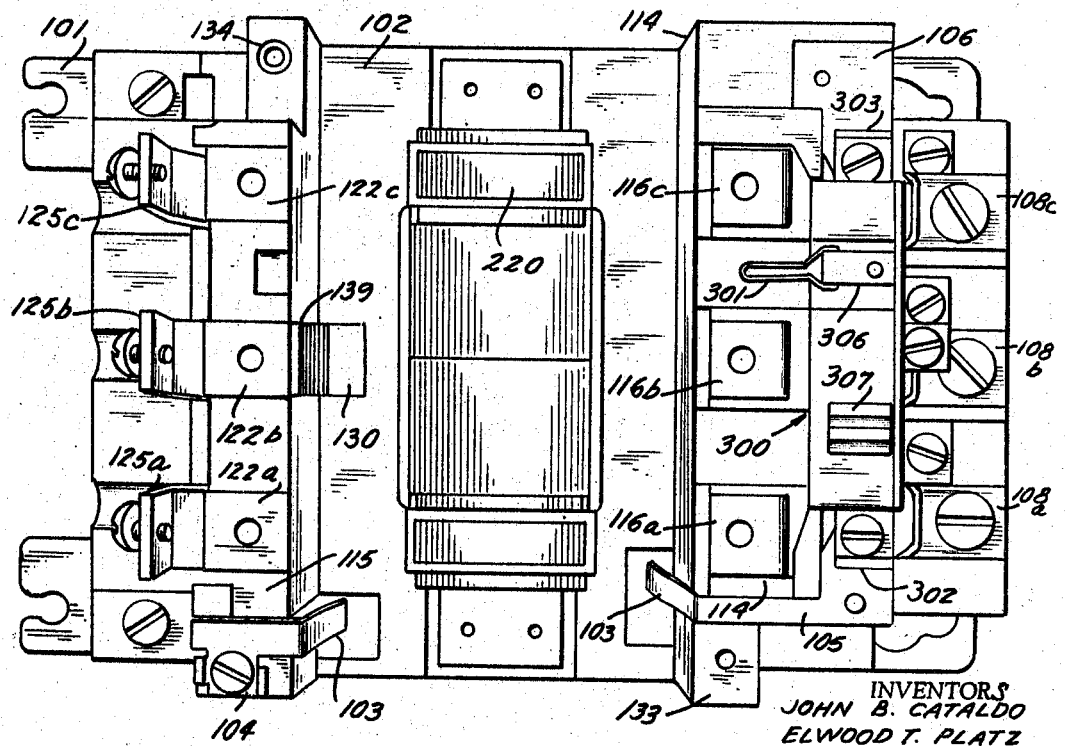

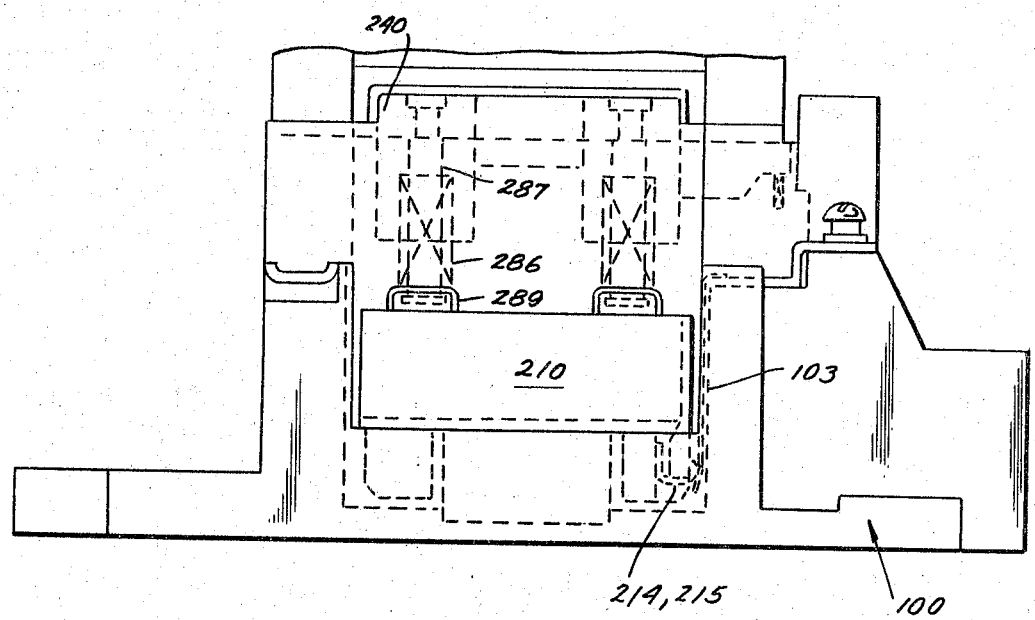
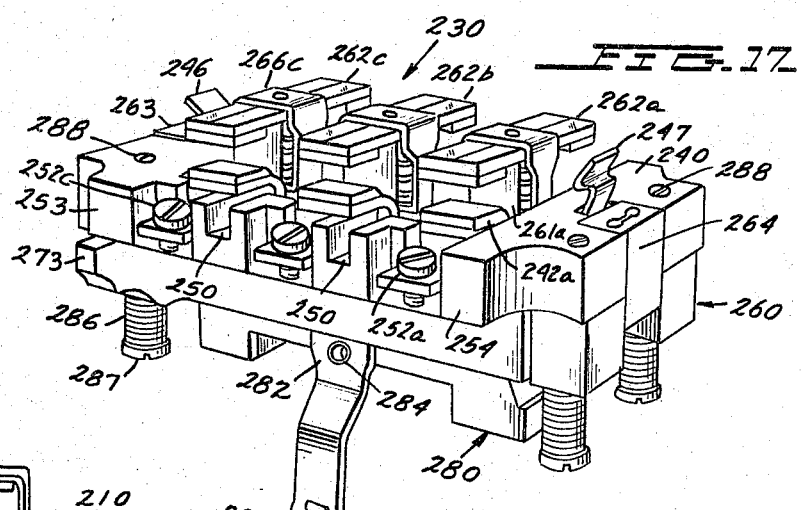
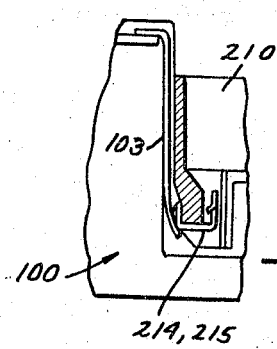

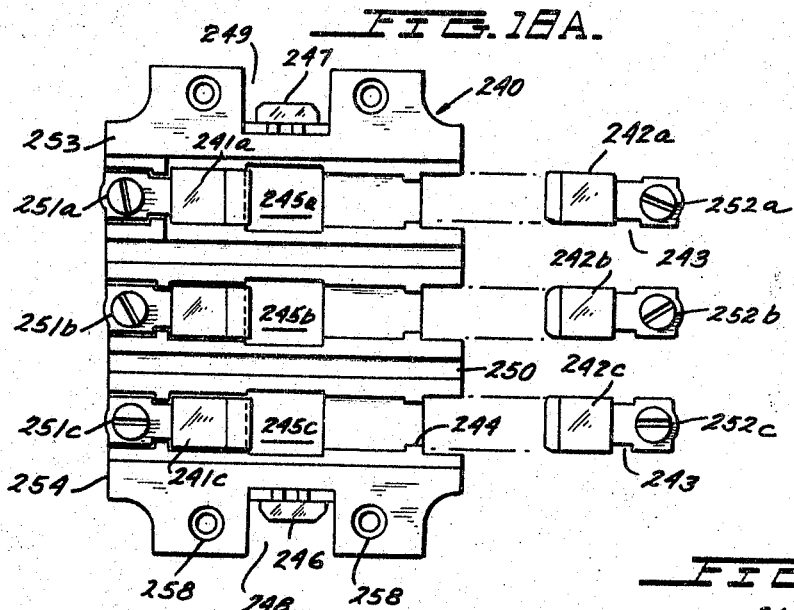
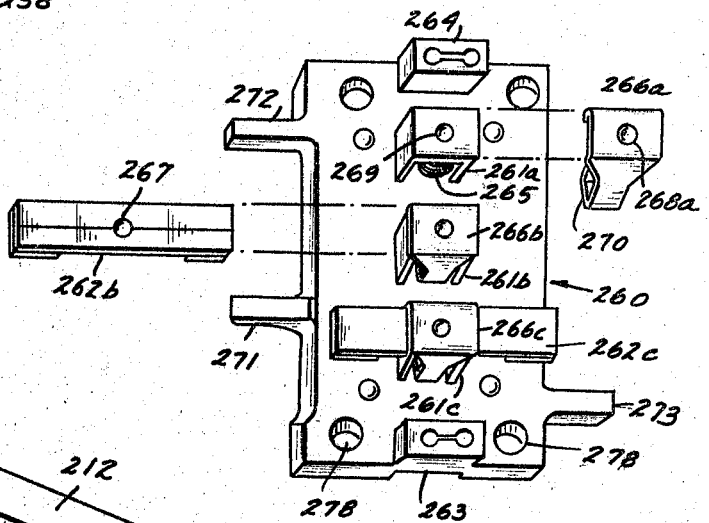
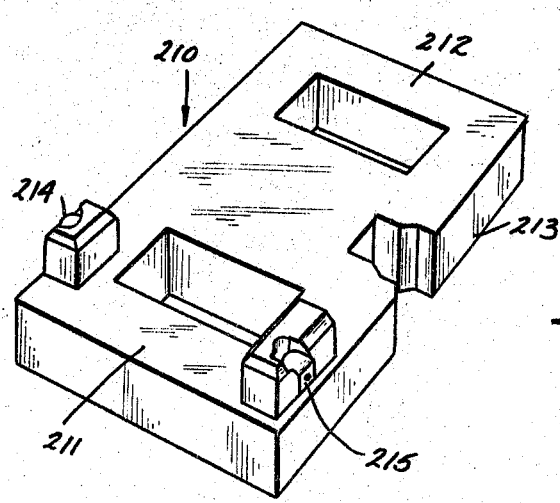

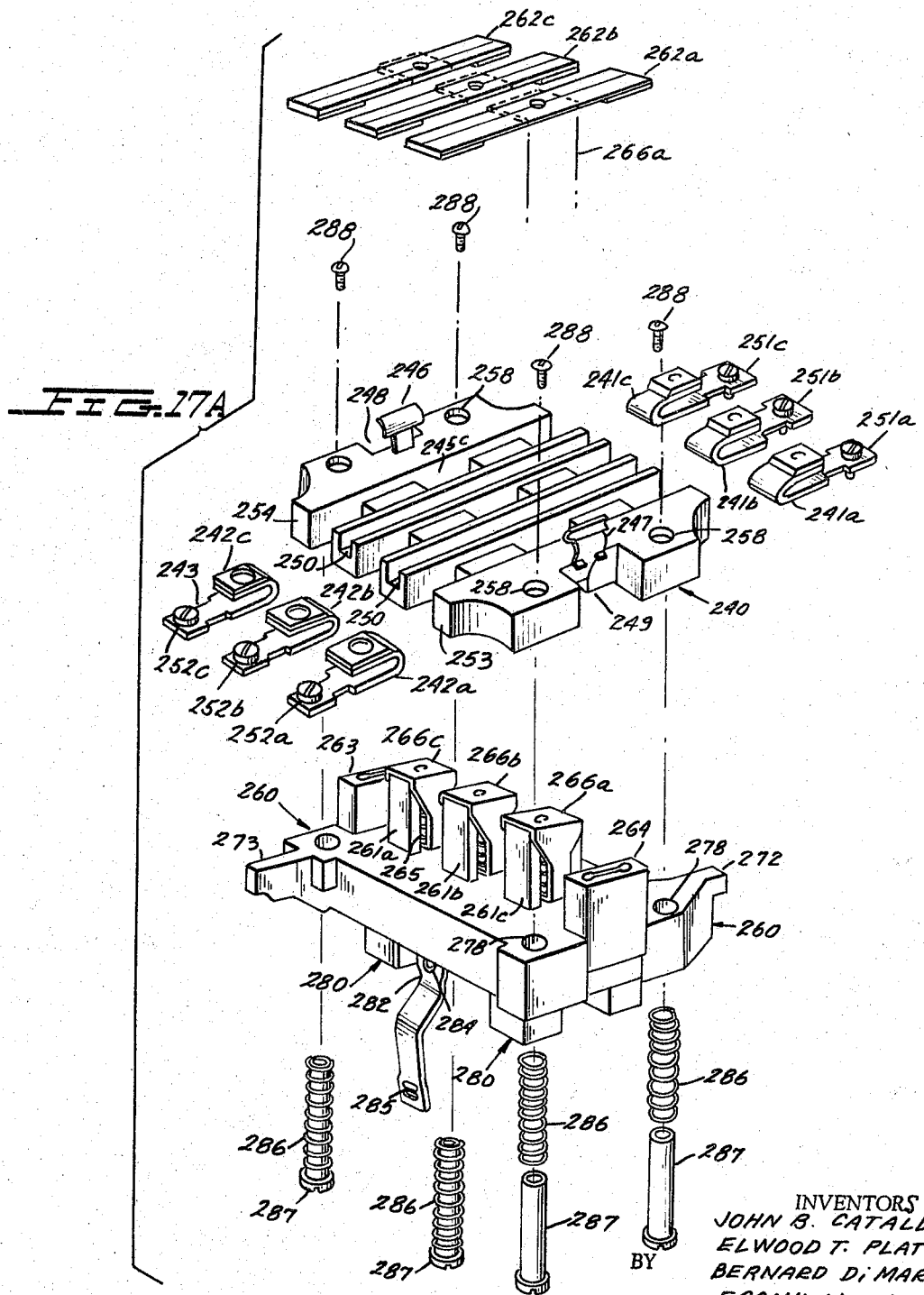

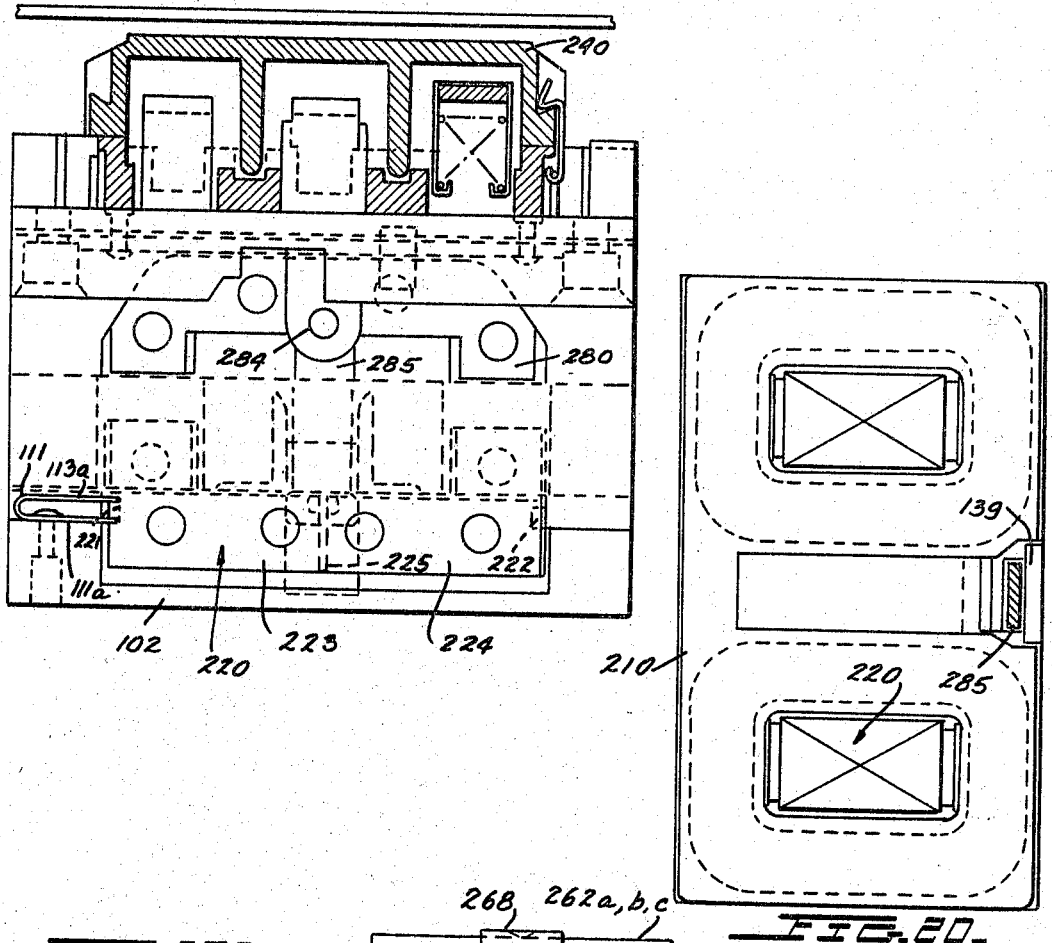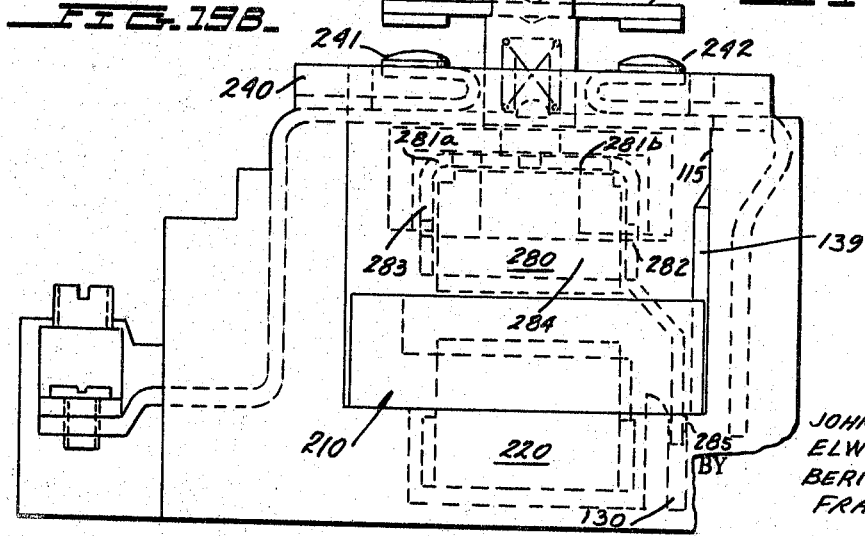

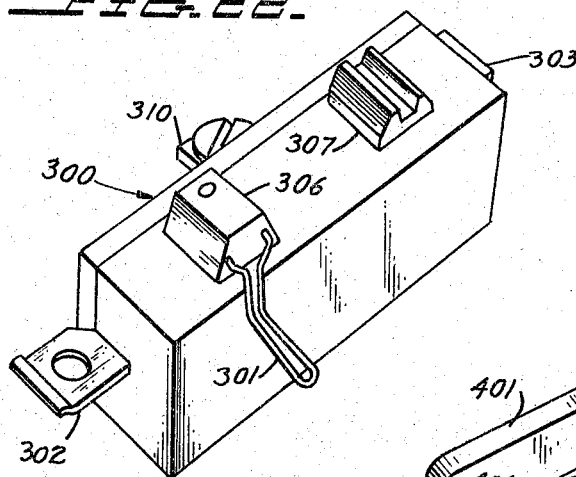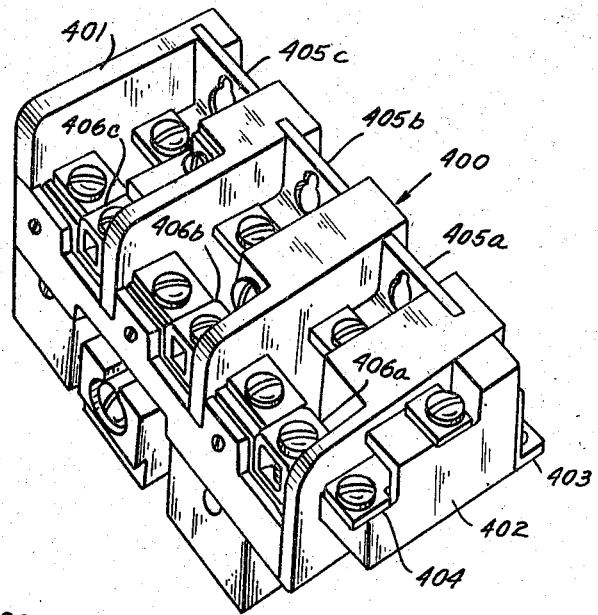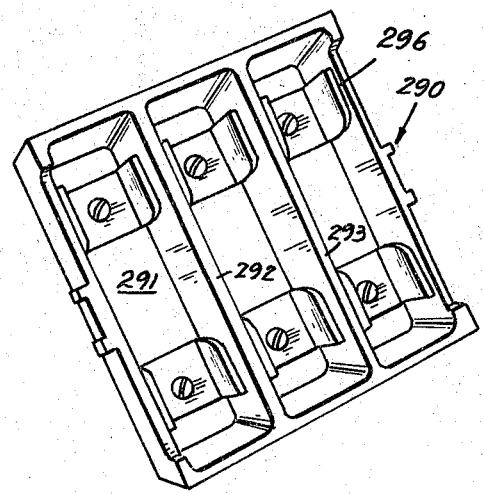

June 6, 1967    J. B. CATALDO ET AL    3,324,431
ELECTROMAGNETIC CONTACTOR HAVING INTERCHANGEABLE
AUXILIARY DEVICES
Filed April 24, 1962    17 Sheets-Sheet 17
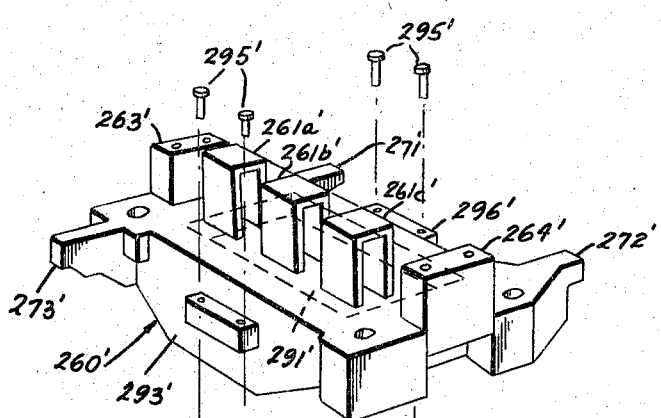
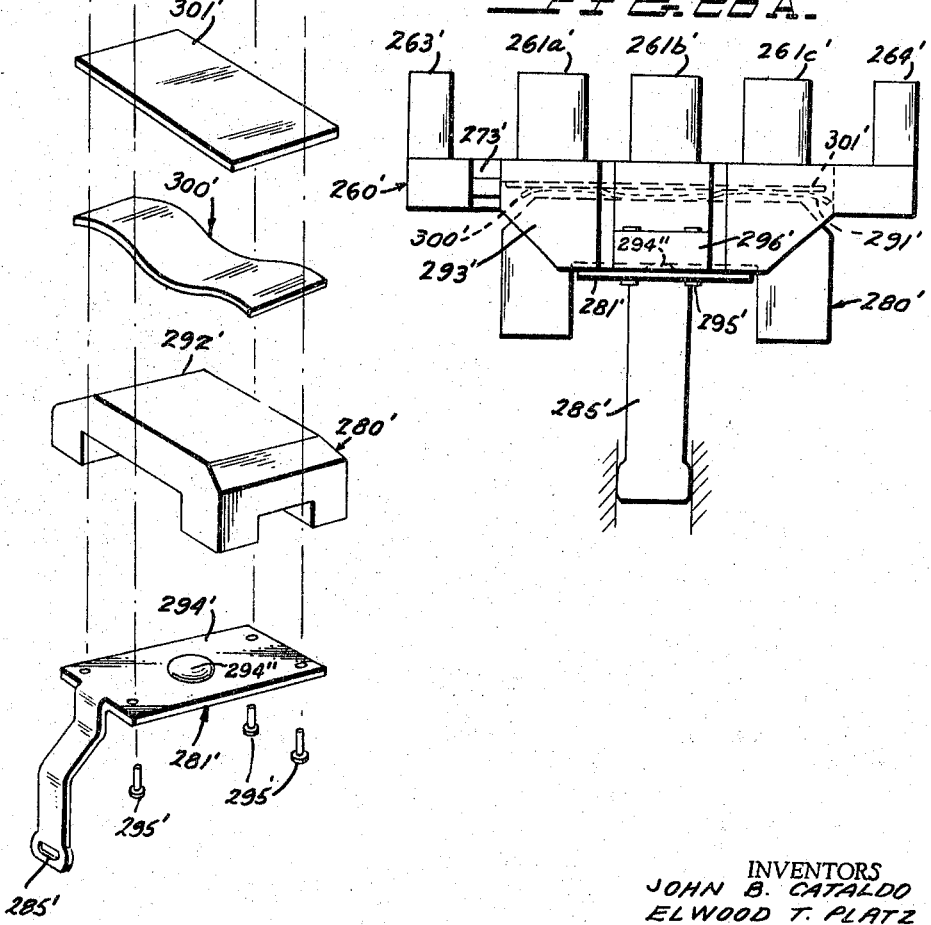
INVENTORS
JOHN B. CATALDO
ELWOOD T. PLATZ
BY   BERNARD DiMARCO
FRANK W. KUSSY
OSTROLENK, FABER, GERB & SOFFEN
ATTORNEYS United States Patent Office 3,324,431
Patented June 6, 1967

3,324,431
ELECTROMAGNETIC CONTACTOR HAVING
INTERCHANGEABLE AUXILIARY DEVICES
John B. Cataldo, Bloomfield Hills, Elwood T. Platz, Grosse Pointe Farms, Bernard Di Marco, Lincoln Park, and Frank W. Kussy, Birmingham, Mich., assignors to I-T-E Circuit Breaker Company, Philadelphia, Pa., a corporation of Pennsylvania
Filed Apr. 24, 1962, Ser. No. 189,915
45 Claims. (Cl. 335—132)

Our invention is related to a contactor and motor starter which has the desirable features of being compact, durable, economical and easy to service.

The novel contactor of our invention is comprised of the basic components of a base assembly, a coil, a yoke, a contact assembly and a cap. The base assembly is capable of receiving a holding interlock and auxiliary interlocks. The contactor can readily be modified to serve as a motor starter by the addition of an overload relay.

All of the components of the contactor and motor starter are supported by the base assembly and are generally contained within the volume defined thereby. The base assembly contains supporting posts and internal terminals which provide a combined mechanical and electrical connection between the base assembly and the remaining components.

The contactor is assembled in a pancake fashion by first positioning a coil on top of the base assembly and thereafter placing the contact assembly on top of the coil and then placing a cap on top of the other components to comprise all of the essential elements of a contactor. If the contactor is to be adapted as a motor starter, an overload relay can be mounted on one end of the base opposite the holding interlock.

The contact assembly is removable and replaceable as an entire unit and is comprised of two basic parts, namely a plate and a carrier. The plate contains the stationary contacts and spring-guide means and the carrier contains the bridging contacts and armature.

Thus, all moving components, including all of the co-operating contacts, are contained within the contact assembly to facilitate the maintenance, inspection and repair of the contactor since the contact assembly is easily and readily removable and replaceable. Furthermore, the contact assembly is so constructed and designed that it remains intact when removed as a unit with the stationary contacts being captured between the bridging contacts and the plate.

The base assembly is constructed with resilient contacts which engage contacts of the coil assembly so that there is a sliding-wiping action between the cooperating contacts of the coil assembly and base assembly whenever the coil assembly is mechanically positioned on the base assembly. A yoke, magnetically energizable by the coil assembly, is resiliently mounted on the base assembly to permit proper seating thereof and to diminish chattering with respect to a pivotally mounted armature mounted on the carrier of the contact assembly.

The base assembly also contains the main (line and load) terminals for the contactor and permits straight-through wiring to these terminals. In like manner, the wiring for the motor starter is also straight-through and can be completed from the line and load end of the assembly. All internal control wiring circuits are automatically completed when the contactor components are mechanically positioned.

The contact assembly is provided with spring-guide means which serve to guide the carrier with respect to the plate and to compensate for any manufacturing variations in dimension of the coil assembly so that the coil assembly will always be held in a fixed position.

The basic contactor is further constructed so that the mechanical positioning of additional components, such as the holding interlock, the overload relay, or the auxiliary interlock will automatically position these components for any necessary electrical connections and mechanical inter-engagement between components.

Thus, the mechanical mounting of the holding interlock on the base assembly automatically electrically connects the holding interlock in electrical series with the coil assembly and its associated resilient contacts. Also the mechanical positioning of the holding interlock automatically aligns it for actuation by the carrier of the contact assembly. In like manner, the mechanical positioning of the auxiliary interlock on the base assembly automatically positions and registers its actuating member in alignment with an extension of the carrier of the contact assembly so that the auxiliary interlock will be operated in accordance with the physical movement of the cooperating contacts.

Furthermore, the mechanical positioning of the overload relay on the base assembly will result in the automatic electrical connection of each pole of the relay in electrical series with each pole of the contactor.

Thus, the basic element for the reference of all components of both the contactor and the motor starter is the base assembly and all mechanical and electrical inter-relationships are automatically made and completed by the mere mechanical mounting of the various components on the base assembly.

An object of our invention is to provide an economical and durable contactor comprised of a base assembly, coil, yoke, contact assembly and cap.

Another object of our invention is to provide a motor starter comprised of the basic components of a base assembly, coil, yoke, contact assembly, cap, holding interlock, overload relay and auxiliary interlock wherein all parts are mounted and assembled on the base assembly and are generally confined within the volume defined by the base assembly.

A further object of our invention is to provide a contactor or starter in which the device can be operative in any one position of 360° rotation.

A still further object of our invention is to provide a contactor having a contact assembly containing every moving part of the contactor.

Another object of our invention is to provide a contact assembly for a contactor which is readily removable and replaceable as a unitary device without affecting any other components of the contactor or motor starter.

A further object of our invention is to provide a novel base assembly wherein the mechanical supports for the components of the motor starter also serve as the electrical connections for the unit.

A still further object of our invention is to provide a contact assembly comprised of only a carrier and a plate wherein the carrier can be manually operated in order to test the various components.

Another object of our invention is to provide a contact assembly which gives a visual indication of the position of the cooperating contacts.

A further object of our invention is to provide a contact assembly for a contactor wherein the "spring-guide members" serve as (a) a bias for a carrier with respect to a plate as well as a guide member, (b) a positioning means for the coil, (c) an automatic compensating means for tolerance variations between the support for the plate and the coil while, (d) permitting the spring-guide means to be an integral part of the contact assembly so that it may be removable and replaceable therewith.

Typical further objects of our invention are listed below:
The contact assembly is supported on the base molding and the carrier thereof is partially guided by the plate and its associated components.

The contact assembly is provided with a novel bias-guide means to avoid undesirable effects due to dimensional variations in manufacturing.

The stationary contacts of the contact assembly are interlocked to the plate against transverse motion and when the movable bridging contacts are in position the axial movement of the stationary contacts is limited so that the entire contact assembly can readily be removable and replaceable while retaining all cooperating contacts in place.

The bridging contacts on the carrier of the contact assembly are pivotally mounted to permit proper seating of the bridging contacts with respect to the stationary contacts and to equalize the pressure at both sides of the bridging contacts.

The pivotal mounting arrangement of the bridging contacts on the contact assembly serves the functions of ensuring contact pressure while permitting simplicity, economy, and ease of removal and replacement of the bridging contacts.

Three inter-related conical embossments at the pivotal points of the bridging contacts provide means for automatically positioning and centering the contacts with respect to the contact assembly.

The contact assembly carries not only each moving part of the contactor but also carries the stationary contacts so that the removal of the contact assembly permits inspection of all cooperating contacts.

The base assembly is constructed so that all internal (load and line) wiring remains undisturbed when the contact assembly is removed.

The motor starter is assembled in a layer construction by placing the yoke on top of the base assembly, positioning the coil in the yoke, installing the contact assembly, and positioning the cap so that the contact assembly, with all its movable components, can easily be removed without disturbing other components of the contactor.

The yoke and armature may be resiliently mounted to permit the pole faces to properly seat with respect to each other and to minimize chatter at the pole faces.

The base assembly serves as a reference point for all components including the yoke which is biased toward the armature.

The cap and plate for the contact assembly together provide the necessary isolating chambers for each pole of the contactor.

The cap can readily and easily be removed without a tool by merely releasing its spring clips.

The base assembly is constructed with appropriate components to register with configurations of the coil assembly to insure proper positioning of the coil assembly as well as automatic electrical connection thereto when so positioned.

The base assembly is provided with contacts to cooperate with the coil assembly so that when the coil assembly is physically positioned there is a sliding-wiping action between the coil contacts and the resiliently mounted stationary contacts of the base assembly to thereby insure both clean contacts as well as insuring energization of the coil regardless of the axial position of the coil or any variations in the tolerance of the base assembly and/or coil assembly.

The motor starter is provided with a holding interlock in which the start contacts also serve as holding contacts.

The holding interlock is a separate and distinct component which can be independently removable and replaceable on the base assembly without disturbing or affecting any other components of the motor starter.

The holding interlock is so positioned on the base assembly that the stop and start buttons can be mechanically remotely operable, for example by start and stop buttons on the cover of the enclosure immediately above the starter.

The holding interlock can be operated by push-buttons extending in an axial direction so that they can be remotely physically operated through the cover of an enclosure placed over the cap of the motor starter.

The motor starter is built upon a basic base assembly and is constructed so that all wiring has straight-through connections.

The base assembly is constructed so that when each component is mechanically secured in position it is thereby automatically electrically connected in a circuit without additional wiring.

The mechanical connection for each of the components such as the holding interlock and auxiliary interlock automatically positions the components for mechanical inter-relationship with other components such as the contact assembly.

The auxiliary interlock is constructed for use on the right and/or the left hand side of the motor starter, near the line or load end. Furthermore, the same basic auxiliary interlock can be used in a stacked arrangement so that each interlock actuates its adjacent auxiliary interlock without the necessity of providing additional mechanical components.

The novel arrangement has all components positioned on the base assembly so as to permit the removal of any component without disturbing any other component and to accomplish this from the front of the contactor or motor starter.

These and other objects of our invention will be apparent from the following description when taken in connection with the drawings, in which:

FIGURE 1 is an angle perspective view of our novel motor starter.

FIGURE 2 is an exploded perspective view of all of the parts of FIGURE 1.

FIGURE 3 is an end view of the line side of FIGURE 1 with all components in place and one auxiliary interlock on the left.

FIGURE 4 is an end view of the line side similar to FIGURE 3 but with the cap removed and the cooperating contacts closed. The cap is suspended above the unit to illustrate the individual arcing chambers and their relation to the cooperating contacts.

FIGURE 5 is an end view of the load side of FIGURE 1 with all components in place but with the auxiliary interlock removed.

FIGURE 6 is a side view of the left side of FIGURE 1 with all components in place except the auxiliary interlock.

FIGURE 7 is a side view of the right side of FIGURE 1 with all components in place, including the auxiliary interlock, but with the cap removed and the cooperating contacts opened.

FIGURE 8 is a view similar to FIGURE 7 but with the cooperating contacts closed.

FIGURE 9 is a top view of the top of the over-all unit of FIGURE 1 with the cap in place.

FIGURE 10 is a top view similar to FIGURE 9 with the cap removed.

FIGURE 11 is an end view of the load side similar to FIGURE 5 but with the cap, auxiilary interlock or overload relay removed.

FIGURE 11a is a close-up view of the load side of the starter showing details of the internal terminals of FIGURE 11.

FIGURE 14 is a view similar to FIGURE 13 without the coil in place. This figure shows the four supporting posts and all electrical connections that complete the base assembly.

FIGURE 14a is a top view similar to FIGURE 14 and illustrates the supporting terminals.

FIGURE 15 is a partial cross-section drawing of the carrier spring guide.

FIGURE 16a is a perspective view of the coil and illustrates the offset recess in the coil to insure mounting in only one position.

FIGURE 16b is a partial cross-sectional drawing which illustrates the coil electrical connections to the base assembly.

FIGURE 17 is a perspective view of the contact assembly assembled.

FIGURE 17a is an exploded perspective view of the contact assembly of FIGURE 17.

FIGURE 18 is a perspective view of the contact assembly carrier of FIGURE 17a with one movable contact in place and illustrates the conical coining in the bridging contact as well as the pivot bracket and the support extension.

FIGURE 18a is a top view of the contact assembly plate with line side stationary contacts and cap clips. Remaining load side stationary contacts are removed and shown separately in the view.

FIGURES 19a and 19b are cross-sectional drawings to show the inter-relation of the various parts.

FIGURE 20 is a top view of the yoke and coil with the contact assembly removed to show the inter-relationship of the parts.

FIGURE 21 is an end view of the holding interlock with the start contacts open and stop contacts closed.

FIGURE 22 is a top view of the holding interlock of FIGURE 21 showing the actuator.

FIGURE 23 is a top end view of an overload relay.

FIGURE 25 is a view of the cap with blow-out iron.

FIGURE 26 is an exploded perspective illustrating a resilient mounting for the contactor armature.

FIGURE 26a is a side view of the elements of FIGURE 26 with these elements assembled.

Figure 12:
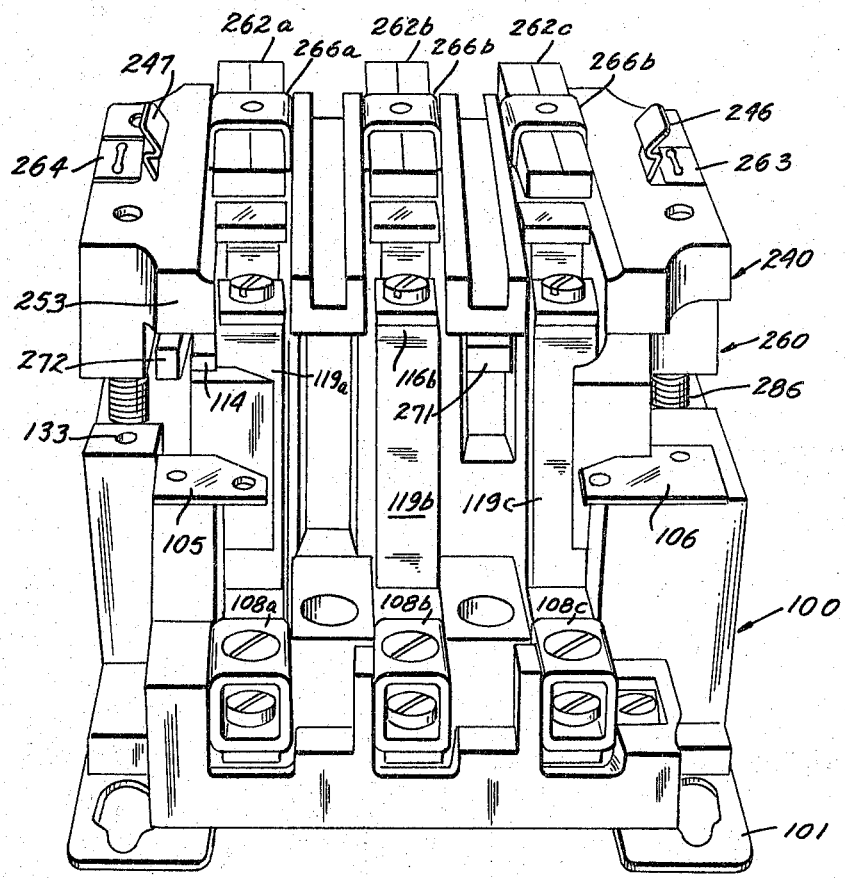
FIGURE 12 is an end view of the line side similar to FIGURE 3 with the cap, auxiliary interlock, and holding interlock removed.

Our motor starter is comprised of basic units comprised of the contactor 200, holding interlock 300, overload relay 400, and auxiliary interlock 500, as best seen in FIGURES 1 and 2.

The contactor 200 is comprised of four basic components, namely the base assembly 100, the coil 210, the yoke 220, and the contact assembly 230, as seen in FIGURE 2. The contact assembly 230 of FIGURE 2 is comprised of the following three basic components: the plate 240, the carrier 260, and the armature 280 (see FIGURES 17, 17a, 19a and 19b).

The base assembly 100 supports a resiliently mounted yoke 220. A recess in the base assembly 100 receives the resiliently mounted yoke 220 and then coil 210 is placed on the next layer so as to surround the protruding legs of the yoke 220. Thereafter, the contact assembly 230 is positioned on top of the coil 210 with the contact assembly being comprised of, in sequence of location away from base assembly 100, an armature 280, a carrier 260 and a plate 240. Thereafter, the cap 290 is placed on top of the contact assembly. Thus, all of the components of the contact assembly 230 along with the yoke 220, coil 210 and base assembly 100 determine the depth as well as the width of the device.

The holding interlock 300 is placed in a recess of the base assembly 100 at the line end and the overload relay 400 is mounted at the load end of the base assembly. The base molding 102 is placed on a mounting plate 101.

The overload relay 400 is a unitary device which contains the sensing elements for the individual poles to be protected and either a single contact or a plurality of contacts for each pole to interrupt the energizing control circuit of the holding magnet. The overload relay 400, mounted on the load end of the contactor, has a width and depth substantially equal to the width and depth of the combination contactor.

Within the confines defined by the base assembly 100, provision is made for the mechanical mounting of an auxiliary interlock 500. The relationship of the components permits the auxiliary interlock 500 to be positioned on the load and/or the line side. Thus all of the components are mounted on the base assembly 100. Each component is positioned by means of inter-related grooves and recesses to prevent improper mounting of the components.

Figure 13:
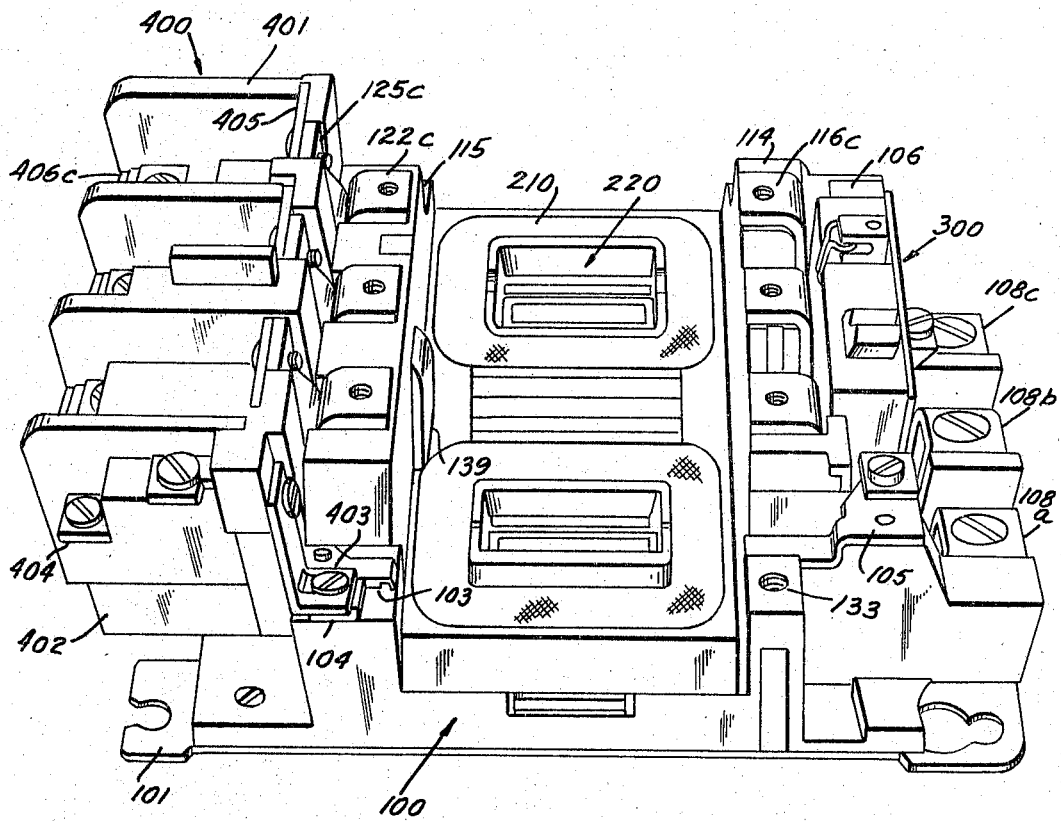
FIGURE 13 is an angle view of the left side of the base assembly without the contact assembly but with the coil and yoke in position.
Figure 24A:
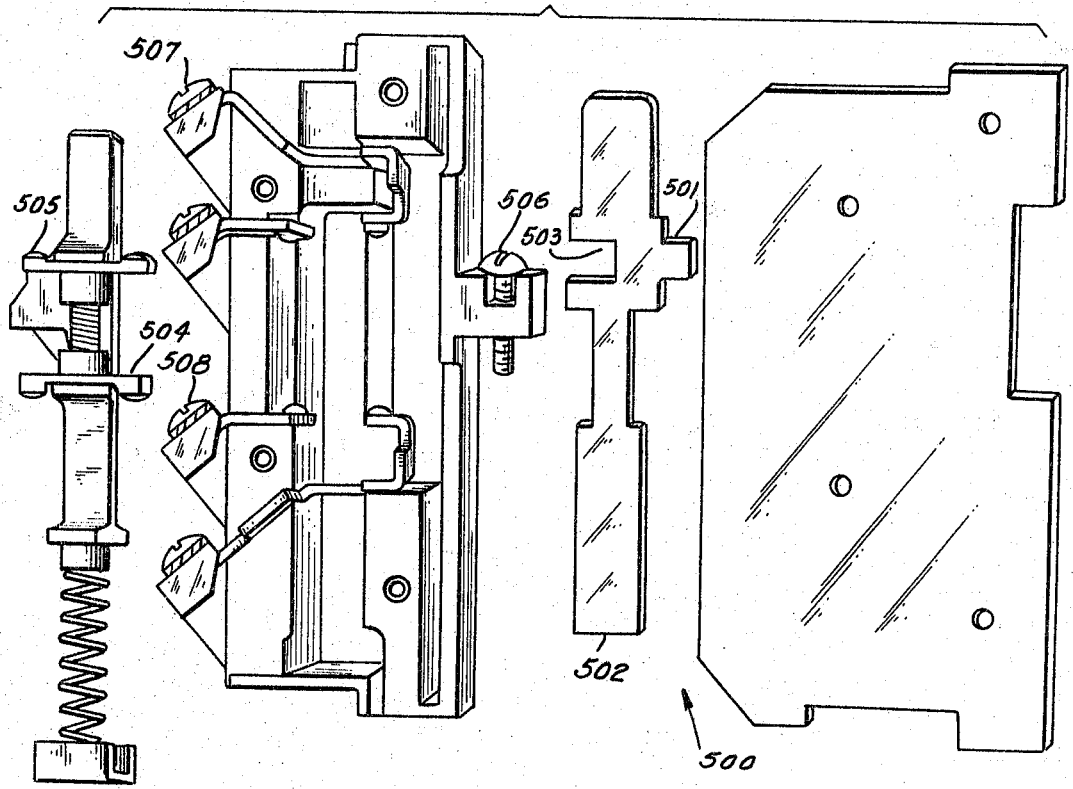
FIGURE 24a is a side view of the auxiliary interlock of FIGURE 24 with parts removed.
Figure 24:
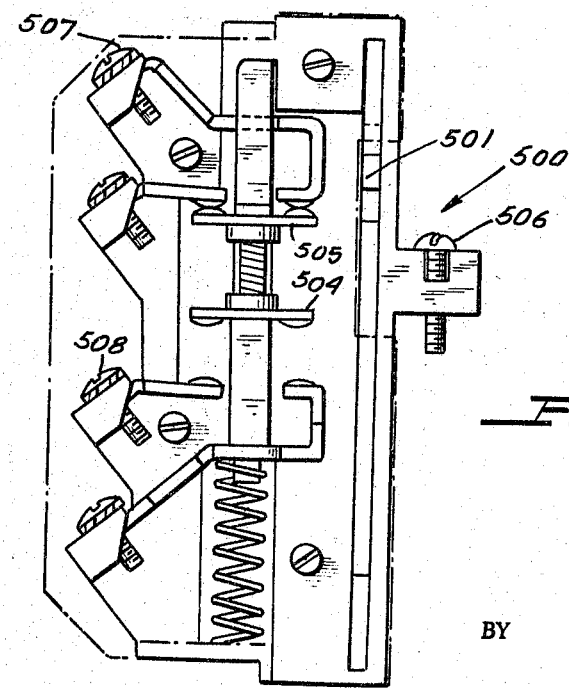
FIGURE 24 is a side view of the auxiliary interlock with terminals on the left, and the actuator-support on the right.

Furthermore, all electrical interconnections are automatically made within the device by way of their mounting means. Thus, for example, the base molding 102 is provided with resilient contacts 103 which serve to not only provide electrical connection to the coil 210 but also serve to partially hold the coil in position as seen in FIGURES 13, 14, 14a. These resilient contacts 103 can be integral extensions of terminals 104-105 mounted on posts of the base molding 102 which posts also serve as supports for components of the contactor or motor starter. Thus there is a compact design in that the terminals 104, 105 and 106 on the posts serve as the supporting point for the components as well as providing the point of electrical connections for the components connected thereto. Thus the design permits a motor starter having the foregoing basic individual components which can be readily and easily mounted and disassembled without the necessity of rewiring or unwiring the various components. By way of example, as shown in FIGURES 1, 2, 4, 6 and 9, the cap 290 can be removed by deflecting the clip members 246, 247 away from recesses 294, 295 so that the contact assembly 230 can be readily inspected. Thus it is not necessary to disassemble any of the components other than the cap 290, nor to disconnect any of the wiring to inspect the contact assembly 230.

In like manner, the coil 210 can be readily observed by removing the contact assembly 230. Since the contact assembly 230 is mounted on the base assembly 100 by securing means 251, 252, e.g., screws that serve the dual functions of mechanically mounting and electrically securing the contact assembly 230, it is only necessary to disconnect the securing means 251, 252 for each of the six stationary contacts 241, 242 to remove the contact assembly 230 for observance and removal of the coil 210.

In view of the above-mentioned electrical connection to the coil 210, the coil can readily and easily be removed without removing any securing means and without unwiring any of the components. Thus the removal of the coil 210 will permit ready access and inspection of the yoke 220.

In a similar manner, the mounting means 302, 303 for the holding interlock 300 can be removed so that the holding interlock 300 is a removable and replaceable component. It should be noted that only the mechanical means need be connected for the holding interlock 300 since these mechanical means 105, 106 and 302, 303 serve to electrically connect the holding interlock 300 to the remaining circuit through the terminals 105, 106 mounted on the posts of the base assembly 100. A similar construction is provided for the overload relay 400 whereby the mechanical securing means 125, 405 also functions as the electrical connecting means.

It should be noted that with the removal of the holding interlock 300, the overload relay 400 and the auxiliary interlock 500, the remaining components as illustrated in FIGURES 11 and 12, comprise a basic contactor having the yoke 220, the coil 210, and contact assembly 230. If the unit is to be used as a basic contactor, then the terminals 104 and 105 on the posts of the base assembly 100 will serve as the wiring terminals to energize the coil 210 of the contactor.

The positioning of the holding interlock 300 provides an automatic register and alignment with an extension 271 on the carrier 260 of the contact assembly 230. The extension 271 of the carrier 260 moves within a groove provided between two posts of the base assembly 100. The holding interlock 300 in turn is provided with a bracket extension 301 extending from the start button 306. The bracket 301 is placed in the path of movement of the extension 271 so that the energization of the coil 210, which results in the axial movement of the carrier 260, will cause the extension 271 to engage the bracket 301 and thus provide a mechanical and electrical interlock for the holding circuit of the contactor and in particular for the energization of the coil 210 when used for three wire control. It will be apparent that a removable extension could be provided for the carrier 260, to functionally replace removable bracket 301, so that the start button 306 would be held down by the removable extension whenever the cooperating contacts of the contact assembly were engaged.

The carrier 260 of the contact assembly 230 is provided with two further extensions 272 and 273 at its extremities which are provided to engage an extension 501 on the auxiliary interlock 500. That is, the positioning of the auxiliary interlock 500 on a post of the base assembly 100 automatically positions an extension 501 in the path of movement of the protrusions 272 and/or 273 so that the movement of the carrier 260 results in the actuation of the auxiliary interlock 500.

*Base assembly 100*

The base assembly 100 is comprised of a unitary molding 102 mounted on a mounting plate 101. The molding 102 serves as the sole and exclusive support for all of the components. Furthermore, the molding 102 serves as the support for all of the electrical terminals which provide the electrical connection between the various components of the motor starter. By way of example, the molding 102 serves as the support for the resilient contacts 103 located in the energizing circuit of the coil assembly 210, as well as for the overload relay terminal 104, and the holding interlock terminals 105 and 106. Also, the molding 102 supports the main line terminals 108, (108a, 108b, 108c) as well as the internal terminals, for both load 122 and line 116 side, to support and electrically connect the stationary contacts 241, 242 on the plate 240. In addition to the internal load connecting straps 122, the base molding 102 provides a support for the terminals 125 to which the overload relay 400 can be mechanically and electrically connected.

In addition to the foregoing, the base molding 102 also serves to position and resiliently support the yoke 220 as best seen in FIGURE 19a. Resilient means 111, 112 is positioned between the base molding 102 and the yoke 220. The yoke 220 is divided in two halves 223, 224 to insure that there will be a permanent air gap 225 between the armature 280 and the yoke 220. However, the two halves of the yoke 220 are held together by external non-magnetic brackets so that the yoke 220 functions as a unitary member. The yoke 220 is provided with transverse slots 221, 222 in the outer extremities of back legs of the yoke. The molding 102 has springs 111 and 112 rigidly secured thereto with lower extensions 111a and 112a which are positioned within the recesses or grooves 221 and 222 of the yoke 220 and thereby limit the upward axial movement of the yoke. The upper legs or extensions 113a and 113b of the springs 111 and 112 act as the upward bias means for the yoke 220. This bias means not only aids in seating the pole faces of the armature 280 with the pole faces of the yoke 220, but also minimizes contact bounce between the bridging contacts 262 and the stationary contacts 241, 242.

As seen in FIGURES 14 and 14a, the base molding 102 is provided with walls 114 and 115 which provide the boundaries for the coil 210 and the contact assembly 230. The walls 114 and 115 also form the four posts at the sides of the molding and also serve as the support for the internal line 116 and load 122 terminals. The internal line terminals 116a, b, and c are mounted on the wall 114 and have extensions 119 which electrically connect the internal line terminals 116 to the main line terminals 108a, b, and c, respectively, as shown in FIGURE 2. The wall 115, on the load end of the base molding 102 provides the support for the internal load terminals 122a, b, and c as well as their respective extensions 125a, b, and c. The electrical extensions 125a, b, and c can be mounted and positioned on the wall 115 to be in the position shown in FIGURES 11 and 11a to receive terminals 405 of the overload relay 400. It should be noted that the internal load terminals 122a, b, and c, are provided with extensions 128a, b, c, captured within the confines of the wall 115. Each of the extensions 128a, b and c, is provided with tapped openings 129 so that transverse extensions can be connected thereto to serve as load terminls for the device when it is used as a basic contactor. In this situation, the extensions 125a, b, and c would be removed.

The wall 115 of the base molding 102, as seen in FIGURES 2, 13, 14 16b and 19b, is provided with an embossment 139 that will serve to guide and position the coil 210 and, furthermore, insure that the coil 210 can only be inserted in a single predetermined position. The base molding 102 provides the reference point for the components since it serves as the supporting means for the yoke 220, for the guide for the carrier 260.

*Coil assembly 210*

The coil assembly 210 is comprised of a first and second coil 211, 212 which are electrically interconnected. The combination of the coil 211 and 212 can be contained within a molding 213 or could be encapsulated within a resin material having the configuration of the molding 213 as seen in FIGURE 16a. The molding 213 provides for both internal and external protection of the coils 211 and 212 as well as providing the necessary support for the coils. The terminals 214 and 215 are provided in the molding 213 and the ends of the interconnected coils 211 and 212 are electrically connected to the terminals 214 and 215. The terminals preferably are an integral part of the coil assembly 210 and are positioned to be in registry and alignment with the resilient contacts 103. The electrical connection of the coil 210 to the contacts 103 is automatically made by the physical positioning of the coil assembly 210 in the base molding 102 as best seen in FIGURE 16b. The embossment 139, as seen in FIGURES 2, 13, 14, 16b and 19b, insures the registry between the coil terminals 214, 215 and the resilient contacts 103. Thus, it is noted that the coil assembly 210 is readily removable and replaceable from the contactor without disturbing or removing any of the basic components or wiring of the components which are mounted on the base assembly 100.

The basic unit wired through the base assembly 100 can be designed to be energized by various voltages. However, in such cases, both the number of turns and the size of the wires of the coils 211 and 212 will have to change. Thus a coil assembly 210 can be made with numerous voltage ratings but will always have the same basic dimensions as illustrated in FIGURES 13, 16a and 19b.

*Contact assembly 230*

The contact assembly 230 of FIGURES 2, 17 and 17a, is comprised of the basic components of plate 240, carrier 260 and armature 280. The plate 240 serves as the point of reference for the contact assembly 230 and is rigidly secured to the base assembly 100 by means of its stationary line contacts 241a, b, and c, and stationary load contacts 242a, b, c which can be electrically and mechanically secured to the internal line terminals 116a, b, c, and the internal load terminals 122a, b, c, respectively. This is best illustrated in FIGURES 4, 10, 11 and 12.

The stationary contacts 241 and 242 are provided with means to interlock with the plate molding in which they are positioned to prevent transverse motion of the contacts. In the embodiment illustrated in FIGURES 17a and 18a, each of the stationary contacts 241a, b, c and 242a, b, c is provided with a slot or groove 243 which enables the stationary contacts 241, 242 to be positioned with respect to an extension 244 in the plate 240. Thus, even when the stationary contacts 241, and 242 are mechanically and electrically separated from the internal load and line terminals 116 and 122, the stationary contacts 241, 242 will remain captive to the plate 240 since they will have limited movement perpendicular to the axial movement of the contact assembly in view of the interlock existing between slot 243 and extension 244.

The plate 240 is provided with three main openings 245a, b, and c to receive the movable contact extensions 261a, b, and c extending from the carrier 260 (see FIGURES 17, 17a, 18 and 18a). The extensions 261a, b, c, carry the movable or bridging contacts 262a, b, and c so that movement of the carrier 260 relative to the plate 240 will result in engagement between the movable or bridging contacts 262a, b, c, and the stationary contacts 241 and 242. The plate 240 is provided with clips 246 and 247 which serve to hold and secure the cap 290 by engagement with recess 294, 295. The cap 290 is preferably designed so that it encompasses all of the areas defined by the stationary contacts 241 and 242 as well as the movable contacts 262.

However, portions of the carrier 260 extending through the plate 240 are not covered by the cap 290. By way of example, the plate 240 is provided with two external grooves 248 and 249 which receive integral extensions 263 and 264 of the carrier 260. These extensions 263, 264 are seen in the side views of FIGURES 6, 7 and 8 as well as FIGURES 9, 10, 17 and 18. Thus, as best seen in FIGURE 9, the extensions 263 and 264 of the carrier 260 are visible and accessible even though the cap 290 is in place. Since the extensions 263, 264 are an integral part of the carrier 240, the manual operations of the extensions 263, 264 will result in the defeating of the bias springs 286. That is, if the main contacts 241, 242-262 are de-energized, an operator can readily test to determine whether or not the holding interlock 300 and the auxiliary interlock 500 are being properly actuated by the carrier 260 by manually pushing down extensions 263 and 264. Furthermore, the extensions 263, 264 will serve as a visual indicator while the main contacts 241, 242-262 are energized so that an operator can visually determine, while cap 290 is in position, whether or not the main contacts are engaged. These extensions 263, 264 may also serve to actuate other devices such as additional interlocks or other circuit controlling devices.

As seen in a comparison of FIGURES 6, 7 and 8, the extension 263, 264 will be biased upward in the direction of the cap 290 when the contacts are opened and are held in a direction away from the cap 290 when the contacts are engaged. The cap 290 is provided with recesses 294, 295 to be engaged by the clips 246-247. Thus the cap 290 will be positioned properly with respect to the cooperating contacts 241, 242-262. The cap 290 (FIGURES 2, 4 and 25) may be provided with chambers 291 a, b, and c which are divided one from the other by means of the ribs or walls 292 and 293. The walls 292 and 293 will provide a barrier between chambers 291a and b and b and c respectively when the cap is positioned by means of the clip members 246, 247. The plate 240 (FIGURES 17, 17a and 19a) furthermore is provided with grooves 250 to receive the extensions 292 and 293 of the cap 290 so that there is a tortuous path existing between adjacent faces. It is noted that the chambers 291a, b and c can be utilized as arc extinguishing chambers and in particular can be used as a support for blow-out iron in order to aid in the interruption of the arc which may exist between the cooperating contacts during the opening operation. An example of a cap 290 containing an arc extinguishing aid such as blow-out iron 296 is illustrated in FIGURE 25.

We have shown the cap 290 with ribs 292, 293 to form chambers 291. Since these ribs engage slots 250 in the plate 240, each pole is electrically isolated from its adjacent pole. However, it will be apparent that our invention can also be carried out by a reversal of parts whereby ribs will extend from plate 240 to engage in slots located in cap 290. With this reversal of the location of ribs 292, 293 and slots 250, a longer electrical creepage path between the stationary contacts of adjacent poles can be obtained.

Each of the extensions 261 a, b, and c of the carrier 260 (FIGURES 17, 17a, 18 and 18a) are provided with a recess to house bias springs 265a, b, c, to pivotally mount movable contacts 262a, b, c. A bracket member 266a, b, and c, straddles each of the extensions 261 and is provided with inwardly extending ears 270 to serve as the support for the biasing springs 265a, b, and c. The movable or bridging contacts 262 can therefore be positioned between the extensions 261 and the bracket 266 to provide the necessary flexibility for each movable contact 262. Each one is preferably pivotally mounted by means of a conical embossment 267 in the movable contact 262 which engages corresponding recesses 269 in the extension 261. The bracket 266 also has a corresponding conical embossment 268 to engage and interlock the other surface of the movable contact 262 thereby resulting in the pivotal mounting of the bridging movable contact 262 with respect to the extensions 261.

The carrier 260 is provided with a transverse extension 271 (see FIGURES 2, 12, 18) which is positioned in an opening in the base molding 102. The extension 271 is in direct alignment with the removable bracket 301 (see FIGURES 14, 14a and 22) of the holding interlock 300. As will herein after be more fully described, the holding interlock bracket 301 is connected to the start button 306 of the holding interlock 300 and is normally biased in a direction toward the carrier extension 271. However, due to the fact that the bracket 301 is selectively positioned below the path of movement of the carrier extension 271, the start button 306 can either be moved or held in the closed position when the carrier 260 is moved in a direction to close the cooperating contacts. The carrier extension 271, positioned above bracket 301, will engage the bracket 301 located in the path thereof, and hold the start button 306 in the closed position as seen by a comparison of FIGURES 3 and 4.

It will be apparent, however, that the removable bracket 301 and its inter-relation with extension 271 can be eliminated and their function served by other components. For example, a removable extension could be added to carrier 260 to engage start button 306 and hold it down when the cooperating contacts are engaged. Thus, the removable actuator is part of the carrier 260 rather than a removable bracket on start button 306 of holding interlock 300. In those two wire control conditions where the start button should not be held in engaged position, either embodiment of removable extensions would be used.

In addition to the carrier extension 271 and as seen in FIGURES 2, 3, 4, 11, 12, 17, 17a and 18, the carrier 260 is provided with further extensions 272, 273 at the extreme ends thereof. As will hereinafter be more fully explained, the auxiliary interlock 500 is provided with an extension 501 (as see in FIGURES 2, 4, 24 and 24a) which is placed in the path of movement of the carrier extensions 272 and 273. The auxiliary interlock extension 501 is normally biased in a direction toward the extension 272, 273 so that energization of the coil 210 resulting in the axial movement of the carrier 260 will result in the engagement of the extension 501 by either the carrier extension 272 or 273 thereby actuating the auxiliary interlock 500 so that it will accurately indicate the position of the cooperating contacts 241, 242-262 carried by the carrier 260. It should be noted that the mechanical and electrical positioning of both the holding interlock 300 as well as the auxiliary interlock 500 result in the automatic positioning of their respective extensions 301 and 501 in the path of movement of the carrier extensions 271, 272 and/or 273. Thus, when the holding interlock 300 and the auxiliary interlock 500 are mechanically and electrically mounted on the base molding 102, they are thereby automatically positioned to be coordinated with the operation of the contact assembly 230 for necessary and proper actuation thereby.

As heretofore noted, the contact assembly 230 carries all of the movable components for the motor starter or contactor and in particular the carrier 260 with its assembly of cooperating contacts 241, 242–262 and armature 280. The armature 280 is mounted on the carrier 260 and in one embodiment of our invention as illustrated in FIGURES 17, 17a and 19a, 19b, there is provided an armature mounting plate 281 rigidly secured to the carrier 260 in any desirable manner. The armature mounting plate 281 can have extending ears 282, 283 which provide the pivot 284 for the armature 280. However, it is apparent that the armature could be resiliently mounted in substantially the same way as heretofore described in connection with the yoke 220.

Thus the two pole faces of the armature 280 are free to rotate about the pivot 284 and thereby further minimize the seating problem when the pole faces are mated with the resiliently mounted yoke 220 heretofore described in connection with the base asembly 100. Thus the pivotal mounting of the armature 280 will facilitate the mating of the pole faces of the armature 280 with the yoke 220 notwithstanding any tolerance deviations in the construction of the molding 102 and/or the contact assembly 230. The armature mounting plate 281a, b, has one of the two ears 282 provided with and integral extension 285 as seen in FIGURES 17, 17a. The extension 285 will be positioned within the recesses 130 of FIGURES 2, 14, 14a of the molding 102. The extension 285 and the recess 130 provides a lower guide for the entire carrier assembly 260. The point of contact in recess 130 at the end of the extension 285 is the principle lower guide point. By providing the guide point at a substantial distance from the carrier 260, it is possible to obtain better and more accurate guiding of the carrier 260.

In addition to the lower guide 285–130, the carrier 260 is provided with a combination biasing means and guide member 286–287 as seen in FIGURES 15, 17 and 17a. That is, since the carrier 260 contains the bridging contacts 262a, b, c, it is necessary that the carrier assembly 260 be biased toward the open position. To this end, we have provided four identical biasing means 286 located at the four corners of the carrier 260. The guide members 287 for the biasing means 286 pass through openings 278 in carrier 260 and through openings 258 in plate 240, being secured to the four corners 258 of the plate 240 by screws 288. The guide members 287 are dimensioned to have a length less than the distance between the plate 240 and the upper surface of the coil 210. Thus, the biasing means 286 serves to bias the carrier 260 with respect to the plate 240 and the bias is independent of the relationship of the contact assembly 230 with respect to the base molding 102. The pins 287 secured to the plate 240, however, serve a dual function since each pin 287 passes through an enlarged opening 278 in the carrier 260. The biasing action of the spring 286 is between the lower surface of the carrier 260 and an extension on the lower portion of the pins 287. Since the pin 287 is rigidly secured to the plate 240, the pins 287 will serve as an upper guide for the carrier 260 with respect to the plate 240 irrespective of the relationship of the contact assembly 230 with respect to the base molding 102 and/or coil 210. Thus the combination 286–287 serves a dual function and provides the necessary biasing for the carrier 260 as well as to provide a guide for the carrier 260 with respect to the plate 240.

It is also possible to insure that this combination 286–287 performs a third function, namely, to hold the coil 210 in place. As heretofore mentioned, the length of the pin 287 is intentionally made shorter than the distance between the plate 240 and the coil 210 in order to eliminate the necessity for critical tolerances in the construction of the various molding parts. That is, the plate 240 is provided with extension 253 and 254 which rests on the walls 114, 115 of the base molding 102 as seen in FIGURES 6, 7, 11 and 12 so that the plate 240 is positioned with respect to the coil 210. Thus, it is essential that the extension of the pin 287 does not engage the coil 210 since the plate 240 would therefore not be properly positioned on the walls 114, 115 and, hence, would create a problem with regard to the mechanical and electrical connection of the stationary contacts 241a, b, c, 242a, b, c, with respect to the internal line terminals 116a, b, c, and internal load terminals 122a, b, and c.

However, it is possible to provide the necessary tolerance leeway and still provide a holding force for the coil 210. To this end, we provide a cup 289 (FIGURE 15) to be positioned around the extension of the pin 287 so that the lower end of the spring 286 rests on the cup 289 rather than on the extension of the pin 287. The lower portion of the cup 289 thus engages the upper surface of the coil 210 and thereby renders the distance between the coil 210 and plate 240 a non-critical distance which is compensated for by movement of the cup 289 with respect to the pin 287.

Thus, in summary, we have provided a novel arrangement whereby the biasing member 286 and the pin 287 (a) serve the function of biasing the carrier 260 with respect to the plate 240, (b) serve as an upper guide for the carrier 260, (c) permit the coil 210 to be held in position, (d) permit a non-critical tolerance to exist between the support walls 114, 115 and the height of the coil 210, (e) provides that the biasing springs 286 are captured springs which are automatically removed with the contact assembly 230 and are held to the contact assembly 230. Thus, the contact assembly 230 is a complete unit which carries the plate 240 and carrier 260, wherein the plate 240 contains the stationary contacts 241a, b, c, 242a, b, c, as well as the biasing guide member 286–287 and the carrier 260 contains the bridging movable contacts 262a, b, c, their contact pressure means 265, and also provides a support and pivot 284 for the armature 280.

Thus the contact assembly 230 is a complete unit carrying all of the movable parts of the contactor. It should be further noted that the contact assembly 230 as a unit is readily removable and replaceable. Since the wear and damage which could be expected in a motor starter or contactor would exist primarily in the moving parts, it is a distinct advantage that all moving parts of the motor starter are contained, confined, and substantially guided by the single unitary contact assembly 230. It would therefore be expected that any conceivable wear or damage to the motor starter could easily and readily be eliminated by the mere replacement of the entire contact assembly 230. It is furthermore noted that in addition to the foregoing desirable characteristics of the contact assembly 230, all of the interrupting duty and requirements of the motor starter are confined within the contact assembly 230 and its cooperating cap 290. Thus, any damage which might be done to the contacts 241, 242–262 as a result of pitting, wearing, etc., can readily be remedied by either replacing the entire contact assembly 230 and/or replacing components within the readily removable contact assembly 230. To this end, we have provided a novel arrangement whereby each contact of the plurality of pairs of cooperating contacts 241a, b, c, 242a, b, c, and 262a, b, c, is individually removable and replaceable.

As previously noted, the yoke 220 is resiliently mounted and the armature 280 is pivotally mounted and each of these constructions contributes to the easy seating of the pole faces and aids in the elimination of chatter or noise due to the independent movement of both of the cooperating magnetic structures. However, additional means are inherently provided in the construction to further minimize any chattering or improper seating of the armature 280 with respect to the yoke 220 by providing the guide bias 286–287 which, in effect, is directly connected to the armature 280. Thus the combination of the three features, namely, the resilient mounting of the yoke 220, the pivotal or resilient mounting of the armature 280, and the resilient mounting of the carrier 260 for the armature will contribute to both proper alignment of the pole faces as well as minimizing chatter at the pole faces.

Holding interlock 300

The holding interlock 300 is best illustrated in FIGURES 1, 2, 3, 4, 14a, 21 and 22. As heretofore mentioned, the holding interlock 300 is provided with two terminal extensions 302, 303 which provide the electrical and mechanical connection for the holding interlock with respect to the base molding 102. Thus by connecting the holding interlock 300 on the base molding 102 at terminals 105–106 it is automatically electrically connected in series with the coil 210. Also, as previously described, the start button 306 is provided with an extension bracket 301 which is actuated and held by means of the carrier extension 271. The manner in which the electrical circuit is thereby affected will hereinafter be more fully described. Basically, the holding interlock 300 is comprised of two sets of bridging contacts, namely start contacts 304, which are normally biased to the open position by bias 308, and stop contacts 305 which are normally biased to the engaged position by bias 309 as seen in FIGURE 21. Electrically the start and stop contacts 304, 305 are in series with each other. Therefore, the manual actuation of the start button 306 will result in the engagement of the normally open start contacts 304 to cause the energization of the coil 210. The energization of the coil 210 will magnetically energize the yoke 220 to attract the armature 280 thereby moving the carrier 260 axially to a position whereby the cooperating bridging contacts 262a, b, and c will engage the stationary contacts 241, 242. When pressure is released from the start button 306, the normally open start contacts 304 open, de-energizing the circuit for the coil 210 and releasing the cooperating contacts 241, 242–262 to their normally open position. In this arrangement, the bracket 301 is removed from the start button 304. This would be the construction used in a two-wire control arrangement. However, in the event it is desirable to have a mechanical and electrical interlock, as for example on a three-wire control system, the bracket 301 would be added to the start button 306 to engage a removable extension 271 on carrier 260. As previously noted, the bracket 301 extends in the path of movement of the carrier extension 271 of the carrier 260 so that the engagement of the cooperating contacts 241, 242–262 will result in the start button 306 being mechanically held down by extension 271. The start contacts 304 will be mechanically held in the engaged position and there will be a continuous energization of the coil 210. Thus, as long as the coil 210 is energized, the start contacts 304 will be mechanically held in the engaged position. This condition will always exist when the removable bracket 301 is added to the start button 306 and/or a removable extension 271 is added to carrier 260 to engage start button 306.

As previously noted, the holding interlock 300 also includes normally closed stop contacts 305 which are actuated by the stop button 307 being moved agianst the bias of spring 309.

Thus, in the event the coil 210 is energized as the result of the start contacts 304 being mechanically held in the engaged position by the extension 271 of the carrier 260, the coil 210 can be intentionally de-energized by actuating the stop contacts 305 by a downward movement of the stop button 307. Since the stop contacts 305 are in electrical series with the start contacts 304, the energization of the coil 210 will be interrupted thereby permitting the biasing means 286 to move the movable contacts 262 to their disengaged position. This, of course, will result in the axial movement of the carrier 260 thereby removing the carrier extension 271 from engagement with the holding interlock bracket 301. Since the start contacts 304 are normally biased open by spring 308, these contacts will move to the open position. Hence, removal of any actuating force from the stop button 307, resulting in the reclosing of the normally closed stop contacts 305, will not result in re-energization of the coil 210. Thus the start contacts 304 serve the dual functions of permitting the initial energization of the coil 210 and, when the bracket 301 is added, of serving as the holding contacts for the energization of the coil 210. It is furthermore noted that the combination start-hold contacts 304 and the stop contacts 305 are normally contained within a unitary housing which is contained within the dimensions defined by the base molding 102. This arrangement permits ready access to the start and stop buttons 306–307.

In other embodiments of our invention, it is possible to place mechanical start-stop actuators on a cover for engagement with the start-stop buttons 306–307. That is, no separate or distinct mechanical or electrical connections need be made to the basic contactor other than the addition of the holding interlock 300 and external mechanical means to engage its respective start-stop buttons 306–307 as desired. It is furthermore noted that in the aforementioned described device, the actuation is intended to be accomplished directly at the motor starter. However, means are provided to permit remote operation of the motor starter. To this end, a terminal 310, as seen in FIGURES 3, 21, 22, is provided between the start and stop contacts 306–307 so that a remote station can be placed in electrical parallel with the start contacts 304. It is noted that even though there may be a remote start button for the motor starter, the mechanical hold for the continued energization of the coil 210, heretofore described in connecttion with the bracket 301, can still be applied to the basic unit. It is further noted that each of the start-stop sets of contacts illustrated in connection with the holding interlock 300 are provided with separate return springs 308–309 and contact pressure springs 311–312. That is, the force of the contact pressure springs 311 or 312 must first be overcome before the contacts 304 or 305 are actually moved. Thus the contacts 304 or 305 will not inadvertently be respectively closed or opened as a result of vibration of the entire motor starter since the contact pressure spring 311 or 312 provides a degree of lost motion for the holding interlock 300. Also, any possible contact wear or pitting will not result in a change of position of the start and stop buttons 306–307 since a variation in dimension will be taken up by the contact pressure spring 311–312. Our novel holding interlock 300 can be adapted for various types of operation. For example, the removal of the bracket 301 will permit the device to be used for remote energization for both two and three-wire control. Furthermore, since the holding interlock becomes a basic part of the starter and is incorporated within the confines of the base molding 102, it can easily and readily be actuated from actuating means mounted on the cover of the motor starter. Thus, each of the foregoing functions is served by the same basic holding interlock 300.

Three-pole overload relay 400

The overload relay 400, comprised of three units and a unitary housing, is illustrated in FIGURES 1, 2, 5, 6, 7, 8, 9, 10, 11, 11a, 13, 14 and 23. In one embodiment of our invention the overload relay 400 is comprised of a unitary housing 401 which forms the support for each of the individual sensing devices. The terminals 405a, b, c on the overload relay are constructed so as to be electrically and mechanically connected to extensions 125a, b, c, of the internal load terminals 122. Each of the individual poles of the overload relay are mechanically connected by a tripper bar to the contact unit 402 mounted at the end of the overload relay 400. The contact unit 402 is comprised of an overcenter spring and pair of electrical contacts which are in an electrical series, by means of the terminals 403–404, with the energizing coil 210. Thus, in the embodiment illustrated, the overload relay 400 forms an extension of the base molding 102 and has substantially the same depth and width as the base molding 102.

*Auxiliary interlock 500*

The auxiliary interlock 500 is illustrated in FIGURES 1, 2, 3, 4, 7, 8, 9, 10, 24 and 24a. The auxiliary interlock 500 is positioned within the volume defined by the base molding 102 and any number of auxiliary interlocks 500 can be added to the basic motor starter. One function of the auxiliary interlock 500 may be to provide an electrical signal at some remote location indicating the position of the motor starter, that is either that it is in the energized or de-energized position. As heretofore mentioned, the mechanical positioning and mounting of the auxiliary interlock 500 on the base molding 102 automatically positions the extension 501 in the path of movement of the carrier extension 272 or 273. Thus the mounting of the auxiliary interlock 500 automatically mechanically coordinates it so that the axial movement of the carrier 260 will effect the positioning of the contacts 504–505 of the auxiliary interlock 500 as a result of the engagement of extension 501 by the carrier extension 272 or 273. The auxiliary interlock 500 is comprised of a plurality of contacts 504–505 which may be selectively provided in various combinations to be normally opened and normally closed. The actuation of the extension 501 defeats the normal condition of the contacts 504–505 to force them to the reverse position. It is noted that the auxiliary interlock 500 has a simplicity of construction in that the axial movement of the carrier 260 is directly inter-connected through the extension 272, 273 to the extension 501 and there is corresponding axial movement of all of the components including the contacts of the auxiliary interlock 500. Thus it is not necessary to change the direction of motion since both the auxiliary interlock 500 and the carrier 260 have straight line axial motion. The auxiliary interlock 500 can be selectively positioned in the molding 102 by attaching its connector 506 to the threaded openings 133 or 134 in base molding 102. That is, the auxiliary interlock 500 is connected to either or both openings 133, 134 at the line and/or load end respectively of the motor starter. It is noted that the same auxiliary interlock 500 can be used in either position since in each situation the extension 501 is directed inwardly toward the starter so that it will be in the path of movement of the carrier extensions 272, 273. The extension 501 is carried on an actuator 502 which has a recess 503 on the reverse side. The recess is positioned in alignment with the extension 501 and has a depth substantially equal to the length of the extension 501. Since the entire auxiliary interlock 500 is a basically flat member, a plurality of such identical auxiliary interlocks can be stacked one against the other and are mechanically tied together by the inter-relation of the extension 501 in opening 503, with one auxiliary interlock 500 being positioned with its extension 501 located in the recess 503 of the actuator 502 in the adjacent auxiliary interlock. Thus actuation of the extension 501 by means of the carrier extension 272 or 273 will be automatically transferred to the remaining stacked auxiliary interlock through the movement of the recess 503 in actuator 502 and its subsequent engagement with the adjacent extension 501. It is furthermore noted that the actuator 502 is preferably made of a flat member and, as heretofore noted, the extension 501 and recess 503 have substantially similar dimensions. As a result, the actuator 502 within any given interlock 500 can be reversed 180° so that the extension 501 can be operated from either side of the interlock 500.

Thus, the basic auxiliary interlock 500 illustrated and described can be used at any location on the motor starter and can be stacked in combinations of two or more.

FIGURES 26 and 26a illustrate a resilient mounting of the contactor armature to its carrier. In this embodiment carrier 260' is similar in construction to carrier 260 having interlock projections 271', 272', 273', extending from the sides thereof. Contact spring housing extensions 261a', 261b', 261c' and indicator extensions 263', 264' project upwardly from carrier 260'.

The bottom of carrier 260' is provided with recess 291'. Web portion 292' of armature 280' is positioned between carrier downward extensions 293' and extends into recess 291'. Main portion 294' of armature mounting plate 281' is secured to carrier 260' by means of rivets 295' extending through carrier ledges 296'. Main portion 294' is disposed between the pair of armature legs thereby maintaining armature 280' in operative position.

Curved leaf spring 300' is positioned within recess 291' above web portion 292' and is lightly loaded to urge armature 280' downwardly. When the contactor is operated misalignment between armature 280' and yoke 220 is compensated for by spring 300'.

Armature 280' is spaced from armature mounting plate 281' by pivot projection 294''. Projection 294'' might be formed by indenting plate 281'. As was noted above, in order to eliminate chatter between the yoke 220 and the armature 280', the armature 280' must be able to pivot so that it can squarely meet both legs of the yoke. The pivot projection 294'' has a rounded surface, thereby permitting the armature 280' freedom to pivot in any direction it must in order to meet the yoke 220.

Insulating plate 301' is interposed between spring 300' and carrier 260' to insulate line parts associated with the movable contacts. Armature bracket downward extension 285' cooperates with a groove in the base for guidance of the contact assembly.

Although we have described preferred embodiments of our novel invention, many variations and modifications will now be obvious to those skilled in the art, and we prefer, therefore, to be limited not by the specific disclosure herein but only by the appended claims.

We claim:

1. A contactor comprised of a base assembly, a contact assembly; said base assembly being providing the sole support for said contact assembly; said base assembly comprised of a base containing a yoke which has a coil thereover; said contact assembly being comprised of a plate, a carrier and an armature and means to mechanically interconnect these components; a plurality of pairs of stationary contacts mounted on said plate; a plurality of pairs of bridging contacts mounted on said carrier; biasing means to bias said carrier with respect to said plate to permit electromagnetic engagement and normally biased disengagement between said plurality of bridging contacts and said plurality of stationary contacts; said base assembly and said contact assembly extending substantially in a first and second plane parallel to each other; said plurality of bridging contacts having movement into and out of engagement with said plurality of stationary contacts along a first line perpendicular to said first and second plane; said armature being mounted on said carrier and operatively positioned to engage said yoke when said coil is energized; an interlock mounted on said base assembly; means connecting said interlock mechanically and electrically to said contactor; said contact assembly being removable and replaceable as an entire unit from said base assembly without removing said interlock or any other components from said base assembly.

2. A contactor comprised of a base assembly, a contact assembly; said base assembly providing the sole support for said contact assembly; said base assembly being comprised of a base containing a yoke which has a coil thereover; said contact assembly being comprised of a plate, a carrier and an armature and means to mechanically interconnect these components; a plurality of pairs of stationary contacts mounted on said plate; a plurality of pairs of bridging contacts mounted on said carrier; biasing means to bias said carrier with respect to said plate to permit electromagnetic engagement and normally biased disengagement between said plurality of bridging contacts and said plurality of stationary contacts; said base assembly and said contact assembly extending substantially in a first and second plane parallel to each other; said plurality of bridging contacts having movement into and out of engagement with said plurality of stationary contacts along a first line perpendicular to said first and second plane; said armature being mounted on said carrier and operatively positioned to engage said yoke when said coil is energized; said contact assembly being removable and replaceable as a unit from said base assembly; said carrier being positioned between said plate and said base assembly; guide means secured to said plate and extending through said carrier to thereby permit said guide means to rest on top of said coil; said carrier being slidably mounted with respect to said guide means.

3. The device of claim 2 wherein said contact assembly contains all moving parts of said contactor and also contains all guide means for the moving parts.

4. A contactor comprised of a base assembly and a contact assembly; said base assembly being comprised of a base containing a yoke which has a coil thereover; said contact assembly being comprised of a plate, a carrier and an armature and means to mechanically interconnect these components; a plurality of pairs of stationary contacts mounted on said plate; a plurality of pairs of bridging contacts mounted on said carrier; biasing means to bias said carrier with respect to said plate to permit electromagnetic engagement and normally biased disengagement between said plurality of bridging contacts and said plurality of stationary contacts; said base assembly and said contact assembly extending substantially in a first and second plane parallel to each other; said plurality of bridging contacts having movement into and out of engagement with said plurality of stationary contacts along a first line perpendicular to said first and second plane; said base containing both first and second terminal means; said contact assembly being electrically and mechanically connected to said first terminal means; said second terminal means being positioned to receive said coil in position and electrically connect said base assembly to said coil; said base providing the sole support for said contact assembly; said carrier having thereon mounted all movable parts of said contactor; a cap for said contact assembly; said cap being removable and replaceable from said contact assembly without removing any part of said contactor and providing protection for said plurality of pairs of stationary and bridging contacts; said cap being so constructed and positioned that said carrier is observable from the top as well as a first and second side when said contactor is assembled with said cap in position; said carrier being manually operable without said cap being removed.

5. The contactor of claim 2 wherein said biasing means is positioned with respect to said guide means to provide a biasing force for said carrier; said contact assembly containing all moving parts of said contactor and also containing all guide means for the moving parts; said guide means holding said coil in position when said contact assembly is mechanically and electrically secured to said base assembly.

6. The device of claim 5 wherein said base assembly has first terminal means on which said stationary contacts can be mounted; said guide means being automatically adjustable in length to thereby compensate for the tolerance variations between the first terminal means and the height of said coil.

7. The device of claim 6 wherein said guide means is an integral part of said contact assembly and is removable and replaceable therewith.

8. The device of claim 6 wherein said base contains second terminal means and an opening to hold and position said coil; said coil being automatically electrically connected to said second terminal means when said coil is mounted and positioned in said opening of said base; first terminal means including line and load terminals for said contactor; said contact assembly electrically bridging said line and load terminals when said contact assembly is mechanically and electrically mounted on said base assembly; said base constructed to serve as the sole support and positioning means for said plate; said plate and said guide means attached thereto constructed to serve as the sole support and guide for said carrier.

9. The device of claim 6, in which said guide means is secured at one end to said plate and has a cup slidably secured to the opposite end; biasing means positioned on said guide means between said carrier and said cup; said cup being automatically adjustable along the length of said guide means to thereby compensate for manufacturing tolerances between the three interrelated members of the coil, base and contact assembly.

10. The device of claim 9, wherein said cup extends beyond the end of said guide means and prevents said guide means from engaging said coil.

11. The device of claim 10 wherein said guide means is an integral part of said contact assembly and is removable and replaceable therewith as an entire unit from said base assembly.

12. A contactor comprised of a base assembly and a contact assembly; said base assembly comprised of a base containing a yoke which has a coil assembly thereover; said contact assembly being comprised of a plate, a carrier and an armature and means to mechanically interconnect these components; a plurality of pairs of stationary contacts mounted on said plate; a plurality of pairs of bridging contacts mounted on said carrier; biasing means positioned to bias said carrier with respect to said plate to permit electromagnetic engagement and normally biased disengagement between said plurality of bridging contacts and said plurality of stationary contacts; said base assembly and said contact assembly extending substantially in a first and second plane parallel to each other; said plurality of bridging contacts having movement into and out of engagement with said plurality of stationary contacts in a first direction perpendicular to said first and second plane; said base containing both first and second terminal means; said contact assembly being electrically and mechanically connected to said first terminal means; said second terminal means being positioned to receive said coil assembly in position and electrically connect said base assembly to said coil assembly; said base providing the sole support for said contact assembly; said carrier having thereon mounted all movable parts of said contactor; said plate having a plurality of holding means to receive respectively each of said plurality of stationary contacts; said holding means preventing movement of said stationary contacts in the plane of said plate; said carrier having extension extending through said plate to hold and position said plurality of bridging contacts; said plate and said plurality of stationary contacts being positioned between said carrier and said plurality of bridging contacts; said plurality of bridging contacts being positioned so as to limit the axial movement of said plurality of stationary contacts; each of said plurality of bridging contacts being pivotally mounted on said carrier to thereby ensure proper seating with respect to said plurality of stationary contacts; each of said carrier extensions is operatively constructed to house and seat a biasing spring, a bracket for each of said carrier extensions; each of said plurality of bridging contacts operatively positioned between said carrier extension and said bracket; each of said biasing springs seated at one end on said bracket and seated at its other end on said extension to thereby provide a biasing force to hold said bridging contacts in position.

13. The device of claim 12 wherein said bracket and said biasing spring are positioned in the center of said bridging contact to thereby permit pivotal movement of said bridging contacts.

14. The device of claim 12 in which means interlock each of said bridging contacts, said brackets, and said carrier extensions to each other to thereby provide a pivot for said bridging contacts and automatically position and locate said bridging contacts with respect to said contact assembly.

15. The device of claim 14 wherein said means comprise a conical configuration in said bridging contacts; said brackets and said carrier extension co-act to allow both positioning and pivotal movement of said bridging contacts.

16. The device of claim 14 wherein said brackets are slidably mounted with respect to said extensions to permit removal of each of said bridging contacts individually without removing said contact assembly from said base assembly.

17. The device of claim 16 wherein each of said stationary contacts is positioned to be individually removable and replaceable after its respective bridging contact has been removed without requiring removal of said contact assembly from said base assembly.

18. The device of claim 17 wherein said stationary and said bridging contacts are positioned to be removable and replaceable without disturbing or moving any internal load wiring in said base assembly.

19. A contactor comprised of a base assembly and a contact assembly; said base assembly being comprised of a base containing a yoke which has a coil assembly thereover; said contact assembly being comprised of a plate, a carrier and an armature; a plurality of pairs of stationary contacts mounted on said plate; a plurality of pairs of bridging contacts mounted on said biasing means to bias said carrier with respect to said plate to permit carrier; electromagnetic engagement and normally biased disengagement between said plurality of bridging contacts and said plurality of stationary contacts; said base assembly and said contact assembly extending substantially in a first and second plane parallel to each other; said plurality of bridging contacts having movement into and out of engagement with said plurality of stationary contacts along a first line perpendicular to said first and second plane; said base containing both first and second terminal means; said contact assembly being electrically and mechanically connected to said first terminal means; said second terminal means being positioned to receive said coil assembly in position and electrically connect said base assembly to said coil assembly; said base providing the sole support for said contact assembly; said carrier having thereon mounted all movable parts of said contactor; said plate having a plurality of holding means to receive respectively each of said plurality of stationary contacts; said holding means preventing movement of said stationary contacts in the plane of said plate; said carrier having extensions extending through said plate to hold and position said plurality of bridging contacts; said plate and said plurality of stationary contacts being positioned between said carrier and said plurality of bridging contacts; said yoke being resiliently mounted on said molded base and said armature being pivotally mounted on said carrier to thereby permit the pole faces of said yoke and armature to properly seat with respect to each other and minimize chatter.

20. The device of claim 19 wherein said resilient mounting of said yoke and said pivotal mounting of said armature permits free movement of said yoke and armature in a plane perpendicular to said first and second plane along the same line as the movement of said bridging contacts.

21. The device of claim 19 wherein said resilient mounting of said yoke provides a biasing force for said yoke in the direction of said armature; said armature being positioned to be removable from said contactor when said contact assembly is removed from said base assembly.

22. A contactor comprising a base assembly and a contact assembly; said base assembly comprising a base containing a yoke which has a coil assembly thereover; said contact assembly being comprised of a plate and a carrier; biasing spring-guide means and a plurality of pairs of stationary contacts mounted on said plate; an armature and a plurality of bridging contacts mounted on said carrier; said carrier being slidably mounted on said biasing spring-guide means to thereby result in electrical engagement and normally biased disengagement between said plurality of said stationary contacts and said plurality of bridging contacts; said base assembly and said contact assembly extending substantially in a first and second plane parallel to each other; said plurality of bridging contacts having movement into and out of said electrical engagement with said plurality of stationary contacts along a first path perpendicular to said first and second planes; said base containing both first and second terminals; said stationary contacts being electrically and mechanically connected to said first terminals; said coil assembly having a first and a second side; said coil assembly having contacts on said first and second sides thereof; said second terminals being positioned to slidably receive said coil assembly to electrically interconnect said base assembly and said coil assembly; said second terminals being resilient to mechanically releasably secure said coil assembly in said base assembly; said base assembly providing the sole support for said contact assembly; said carrier having thereon mounted all movable contacts of said contactor and said contact assembly containing all cooperating main contacts of said contactor; said carrier having extensions extending through said plate to hold and position said plurality of bridging contacts with respect to said stationary contacts; said stationary contacts being positioned between said plate and said bridging contacts; said base assembly having means to register with said coil assembly to insure proper mechanical and electrical positioning of said coil assembly; said armature being mounted on said carrier and wherein there is a protruding guide member extending from said carrier; said base assembly having a recess to seat and guide said protruding guide member.

23. A contactor comprising a base assembly and a contact assembly; said base assembly comprising a base containing a yoke which has a coil assembly thereover; said contact assembly being comprised of a plate and a carrier; biasing spring-guide means and a plurality of pairs of stationary contacts mounted on said plate; an armature and a plurality of bridging contacts mounted on said carrier; said carrier being slidably mounted on said biasing spring-guide means to thereby result in electrical engagement and normally biased disengagement between said plurality of said stationary contacts and said plurality of bridging contacts; said base assembly and said contact assembly extending substantially in a first and second plane parallel to each other; said plurality of bridging contacts having movement into and out of said electrical engagement with said plurality of stationary contacts along a first path perpendicular to said first and second planes; said base containing both first and second terminals; said stationary contacts being electrically and mechanically connected to said first terminals; said coil assembly having a first and a second side; said coil assembly having contacts on said first and second sides thereof; said second terminals being positioned to slidably receive said coil assembly to electrically interconnect said base assembly and said coil assembly; said second terminals being resilient to mechanically releasably secure said coil assembly in said base assembly; said base assembly providing the sole support for said contact assembly; said carrier having thereon mounted all movable contacts of said contactor and said contact assembly containing all cooperating main contacts of said contactor; said carrier having extensions extending through said plate to hold and position said plurality of bridging contacts with respect to said stationary contacts; said stationary contacts being positioned between said plate and said bridging contacts; said base assembly having means to register with said coil assembly to insure proper mechanical and electrical positioning of said coil assembly; said base assembly having a first and second post located at a line end thereof and having said second terminals mounted on said first and second posts; a holding interlock; said holding interlock electrically and mechanically mounted on said second terminals of said first and second posts; said holding interlock contains a start and stop button and start and stop contacts; said holding interlock being contained within a single housing; said start button mechanically connected to actuate said start contacts; said stop button mechanically connected to actuate said stop contacts; first and second terminals extending from opposite ends of said single housing to electrically and mechanically connect said holding interlock.

24. The device of claim 23 wherein said start and stop contacts extend in said one path in a direction perpendicular to said first and second plane.

25. The device of claim 24 wherein a bracket extends from said start button and extends in the path of movement of said carrier to thereby hold said start button in engaged position when said coil assembly is energized and said cooperating contacts are engaged.

26. The device of claim 24 wherein said start and said stop buttons are positioned to be accessible in the same direction as the accessibility of said contact assembly.

27. A contactor comprising a base assembly and a contact assembly; said base assembly comprising a base containing a yoke which has a coil assembly thereover; said contact assembly being comprised of a plate and a carrier; biasing spring-guide means and a plurality of pairs of stationary contacts mounted on said plate; an armature and a plurality of bridging contacts mounted on said carrier; said carrier being slidably mounted on said biasing spring-guide means to thereby result in electrical engagement and normally biased disengagement between said plurality of said stationary contacts and said plurality of bridging contacts; said base assembly and said contact assembly extending substantially in a first and second plane parallel to each other; said plurality of bridging contacts having movement into and out of said electrical engagement with said plurality of stationary contacts along a first path perpendicular to said first and second planes; said base containing both first and second terminals; said stationary contacts being electrically and mechanically connected to said first terminals; said coil assembly having a first and a second side; said coil assembly having contacts on said first and second sides thereof; said second terminals being positioned to slidably receive said coil assembly to electrically interconnect said base assembly and said coil assembly; said second terminals being resilient to mechanically releasably secure said coil assembly in said base assembly; said base assembly providing the sole support for said contact assembly; said carrier having thereon mounted all movable contacts of said contactor and said contact assembly containing all cooperating main contacts of said contactor; said carrier having extensions extending through said plate to hold and position said plurality of bridging contacts with respect to said stationary contacts; said stationary contacts being positioned between said plate and said bridging contacts; said base assembly having means to register with said coil assembly to insure proper mechanical and electrical positioning of said coil assembly; said contactor being convertible to a motor starter by the addition of an overload relay, said overload relay being mounted on and supported by said base assembly.

28. The device of claim 27, including a holding interlock; said second terminals of said base assembly providing the mechanical support for said holding interlock and said first terminals of said base assembly serving as a mechanical and electrical support for said overload relay.

29. The device of claim 28 further comprising an auxiliary interlock; said auxiliary interlock being mountable on said base assembly and having means positioned in the path of movement of said carrier when said auxiliary interlock is mounted on said base assembly to thereby insure mechanical inter-connection between said carrier and said auxiliary interlock.

30. The device of claim 29 wherein said overload relay is electrically and mechanically connected to one of said contacts of said second terminals to thereby place a poriton of said overload relay in electrical series with said coil assembly and said holding interlock.

31. The device of claim 30 wherein said base assembly provides the sole support for said coil assembly, said contact assembly, said holding interlock, said overload relay and said auxiliary interlock, all of these components being contained substantially within the volume defined by said base assembly; said base assembly being substantially rectangular in configuration.

32. A contactor comprising a base assembly and a contact assembly; said base assembly comprising a base containing a yoke which has a coil assembly thereover; said contact assembly being comprised of a plate and a carrier; biasing spring-guide means and a plurality of pairs of stationary contacts mounted on said plate; an armature and a plurality of bridging contacts mounted on said carrier; said carrier being slidably mounted on said biasing spring-guide means to thereby result in electrical engagement and normally biased disengagement between said plurality of said stationary contacts and said plurality of bridging contacts; said base assembly and said contact assembly extending substantially in a first and second plane parallel to each other; said plurality of bridging contacts having movement into and out of said electrical engagement with said plurality of stationary contacts along a first path perpendicular to said first and second planes; said base containing both first and second terminals; said stationary contacts being electrically and mechanically connected to said first terminals; said coil assembly having a first and a second side; said coil assembly having contacts on said first and second sides thereof; said second terminals being positioned to slidably receive said coil assembly to electrically interconnect said base assembly and said coil assembly; said second terminals being resilient to mechanically releasably secure said coil assembly in said base assembly; said base assembly providing the sole support for said contact assembly; said carrier having thereon mounted all movable contacts of said contactor and said contact assembly containing all cooperating main contacts of said contactor; said carrier having extensions extending through said plate to hold and position said plurality of bridging contacts with respect to said stationary contacts; said stationary contacts being positioned between said plate and said bridging contacts; said base assembly having means to register with said coil assembly to insure proper mechanical and electrical positioning of said coil assembly; an auxiliary interlock selectively mountable on said base assembly at either side of said base assembly toward either end thereof.

33. The device of claim 32 wherein said auxiliary interlock has means positioned in the path of movement of said carrier; said auxiliary interlock means being operative by said carrier when said cooperating contacts are moved in said first path into contact engagement.

34. The device of claim 33 wherein said auxiliary interlock is of substantially flat configuration operatively constructed to provide a mechanical interlock between adjacent auxiliary interlocks and thereby provide simultaneous operation of all of said auxiliary interlocks from a single actuation by said carrier.

35. The device of claim 34 wherein said auxiliary interlock has a plurality of sets of cooperating contacts, each of said sets of cooperating contacts being simultaneously operated by said auxiliary interlock means; terminal means on said auxiliary interlock for independent electrical connections to said sets of cooperating contacts.

36. The device of claim 24, in which said holding interlock having a third terminal to thereby render said holding interlock adaptable for remote operation.

37. The device of claim 35 wherein said first terminals on said base assembly permit straight-through wiring of said contactor and motor starter, said second terminals provide all internal control wiring when the components are mechanically positioned so that no additional internal control wiring is required; all external control wiring of said motor starter being straight-through wiring.

38. A contact assembly for a contactor; said contact assembly being comprised of a plate, a carrier and an armature; a plurality of pairs of stationary contacts mounted on said plate; a plurality of pairs of bridging contacts mounted on said carrier; biasing means to bias said carrier with respect to said plate to permit engagement and biased disengagement between said plurality of bridging contacts and said plurality of stationary contacts; said contact assembly extending substantially in a first plane; said plurality of bridging contacts having movement into and out of engagement with said plurality of stationary contacts in a first direction perpendicular to said first plane; portions of said carrier slidably extending through openings in said plate; said contact assembly containing an armature resiliently mounted on said carrier; guide means attached to said plate; said plate and said guide means constructed to serve as the sole support and guide for said carrier.

39. The device of claim 38 whereby said guide is secured at one end to said plate and has a cup slidably secured to the opposite end; biasing means positioned on said guide means between said carrier and said cup; said cup being automatically adjustable along the length of said guide means to thereby provide compensation for manufacturing tolerances.

40. A contact assembly for a contactor; said contact assembly being comprised of a plate, a carrier and an armature; a plurality of pairs of bridging contacts mounted on said carrier; biasing means to bias said carrier with respect to said plate to permit engagement and biased disengagement between said plurality of bridging contacts and said plurality of stationary contacts; said plate and said carrier extending substantially in a first and second plane parallel to each other; said plurality of bridging contacts having movement into and out of engagement with said plurality of stationary contacts in a first direction perpendicular to said first and second plane; said plate having a plurality of holding means to receive respectively each of said plurality of stationary contacts; said holding means preventing movement of said stationary contacts in the first plane of said plate; said carrier having extensions extending through said plate to hold and position said plurality of bridging contacts; said plate and said plurality of stationary contacts being positioned between said carrier and said plurality of bridging contacts; each of said carrier extensions being operatively constructed to house and seat a biasing spring, a bracket for each of said carrier extensions; each of said plurality of bridging contacts operatively positioned between said carrier extensions; each of said plurality of bridging contacts operatively positioned between said carrier extension and said bracket; each of said biasing springs seated at one end on said bracket and seated at its other end on said extension to thereby provide a biasing force to hold said bridging contacts in position.

41. The device of claim 40 wherein said bracket and said biasing spring are positioned in the center of said bridging contact to thereby permit pivotal movement of said bridging contacts.

42. The device of claim 40 in which means interlock each of said bridging contacts, said brackets, and said carrier extensions to each other to thereby provide a pivot for said bridging contacts and automatically position and locate said bridging contacts with respect to said contact assembly.

43. The device of claim 42 wherein said means comprise a conical configuration of said bridging contacts; said brackets and said carrier extension which co-act to allow both positioning and pivotal movement of said bridging contacts.

44. The device of claim 36 wherein said second terminals provide all internal control wiring when the components are mechanically positioned so that no additional internal control wiring is required; all external control wiring of said motor starter being straight-through wiring.

45. A contact assembly for a contactor; said contactor assembly being comprised of a plate, a carrier and an armature; a plurality of pairs of bridging contacts mounted on said carrier; said carrier being slidably mounted with respect to said plate to thereby result in engagement and biased disengagement between said plurality of bridging contacts and said plurality of stationary contacts; said plate and carrier extending substantially in a first and second plane parallel to each other; said plurality of bridging contacts having movement into and out of engagement with said plurality of stationary contacts in a first direction perpendicular to said first and second plane; said plate having a plurality of holding means to receive respectively each of said plurality of stationary contacts; said holding means preventing movement of said stationary contacts in the first plane of said plate; said carrier having extensions extending through said plate to hold and position said plurality of bridging contacts; said plate and said plurality of stationary contacts being positioned between said carrier and said plurality of bridging contacts; said plurality of bridging contacts limiting the axial movement of said plurality of stationary contacts; whereby said armature can be inspected without affecting or removing any of said contacts with respect to each other or with respect to said contact carrier.

References Cited

UNITED STATES PATENTS

| 2,394,090 | 2/1940 | McFarland | 200—168 X |
| 2,513,695 | 7/1950 | Van Valkenburg | 200—104 |
| 2,727,965 | 12/1955 | Toth et al. | 200—168 |
| 2,869,043 | 1/1959 | Locher | 200—168 |
| 2,886,669 | 5/1959 | Kelto | 200—104 |
| 2,897,316 | 7/1959 | Brauneck | 200—104 |
| 2,913,550 | 11/1959 | Austin | 200—168 |
| 2,917,592 | 12/1959 | Craig et al. | 200—168 |
| 2,928,998 | 3/1960 | Brumfield | 200—168 |
| 2,942,157 | 6/1960 | Davis | 317—119 |
| 2,986,676 | 5/1961 | Edmunds | 200—168 |
| 3,054,880 | 9/1962 | Harman | 200—168 |
| 3,102,935 | 9/1963 | Christeler | 200—104 |
| 3,109,905 | 11/1963 | Marquis | 200—104 |

FOREIGN PATENTS

| 518,056 | 3/1953 | Belgium. |
| 899,589 | 6/1962 | Great Britain. |
| 82,151 | 7/1956 | Netherlands. |

OTHER REFERENCES

Schor and Jakel: German printed application S30,395, December 1956.

Jakel: German printed application 1,108,511, October 1957.

BERNARD A. GILHEANY, *Primary Examiner.*

R. K. SCHAEFER, *Examiner.*

T. D. MACBLAIN, R. N. ENVALL, JR., T. A. ROBINSON, *Assistant Examiners.*